United States Patent
Miyamae

(10) Patent No.: US 9,225,245 B2
(45) Date of Patent: Dec. 29, 2015

(54) POWER SUPPLY DEVICE AND METHOD FOR CONTROLLING POWER SUPPLY

(71) Applicant: FUJITSU SEMICONDUCTOR LIMITED, Yokohama-shi, Kanagawa (JP)

(72) Inventor: Toru Miyamae, Kasugai (JP)

(73) Assignee: SOCIONEXT INC., Yokohama (JP)

( * ) Notice: Subject to any disclaimer, the term of this patent is extended or adjusted under 35 U.S.C. 154(b) by 95 days.

(21) Appl. No.: 13/859,358

(22) Filed: Apr. 9, 2013

(65) Prior Publication Data

US 2014/0145692 A1    May 29, 2014

(30) Foreign Application Priority Data

Apr. 13, 2012  (JP) .................................. 2012-091978

(51) Int. Cl.
*H02M 3/158* (2006.01)
*H02M 3/155* (2006.01)
*H02M 1/00* (2007.01)
*H02M 3/156* (2006.01)

(52) U.S. Cl.
CPC .............. *H02M 3/158* (2013.01); *H02M 3/155* (2013.01); *H02M 3/156* (2013.01); *H02M 3/1582* (2013.01); *H02M 3/1584* (2013.01); *H02M 3/1588* (2013.01); *H02M 2001/0009* (2013.01); *H02M 2001/009* (2013.01); *Y02B 70/1466* (2013.01)

(58) Field of Classification Search
CPC ............................ H02M 5/271; H02M 3/1588
USPC ....................................................... 323/283
See application file for complete search history.

(56) References Cited

U.S. PATENT DOCUMENTS

| | | | |
|---|---|---|---|
| 5,006,782 A * | 4/1991 | Pelly | 323/225 |
| 6,977,447 B2 * | 12/2005 | May | 307/31 |
| 7,312,538 B2 * | 12/2007 | May | 307/31 |
| 7,538,527 B2 | 5/2009 | O'Driscoll et al. | |

(Continued)

FOREIGN PATENT DOCUMENTS

| CN | 102142772 A | 8/2011 |
|---|---|---|
| JP | 2003-289666 A | 10/2003 |

(Continued)

OTHER PUBLICATIONS

Daniele Trevisan, et al.: "Digital Control of Single-Inductor Multiple-Output Step-Down DC-DC Converters in CCM," IEEE Transactions on Industrial Electronics, vol. 55, No. 9, Sep. 2008, pp. 3476-3483.

(Continued)

*Primary Examiner* — Timothy J Dole
*Assistant Examiner* — Bryan R Perez
(74) *Attorney, Agent, or Firm* — Arent Fox LLP

(57) ABSTRACT

A power supply device includes a coil, a first switch circuit that accumulates energy in the coil, and a plurality of second switch circuits that couple the coil to a plurality of output terminals. A first control unit generates a first control signal that controls the first switch circuit to turn on and off based on a combined value of a plurality of output voltages respectively output from the plurality of output terminals and a first reference value. A second control unit generates a second control signal that controls the plurality of second switch circuits to turn on and off in a cycle that is the same as the first control signal based on a first output voltage of the plurality of output voltages and a second reference value.

8 Claims, 16 Drawing Sheets

(56) References Cited

U.S. PATENT DOCUMENTS

| | | |
|---|---|---|
| 8,294,506 B2 * | 10/2012 | Ohashi ............................. 327/365 |
| 2003/0184269 A1 | 10/2003 | Nishimori et al. |
| 2006/0221649 A1 | 10/2006 | Yamanaka et al. |
| 2008/0036432 A1 * | 2/2008 | Takada et al. ................... 323/234 |
| 2008/0130331 A1 | 6/2008 | Baldwin et al. |
| 2009/0034302 A1 * | 2/2009 | Cannella et al. ................ 363/56.1 |
| 2009/0039711 A1 * | 2/2009 | Williams .......................... 307/113 |
| 2009/0045786 A1 * | 2/2009 | Krellner et al. .................. 323/259 |
| 2010/0039080 A1 * | 2/2010 | Schoenbauer et al. .......... 323/234 |
| 2010/0052638 A1 * | 3/2010 | Lesso et al. ...................... 323/282 |
| 2010/0231186 A1 | 9/2010 | Chen et al. |
| 2010/0308655 A1 * | 12/2010 | Wachi et al. ....................... 307/31 |
| 2010/0314945 A1 * | 12/2010 | Yamazaki et al. ................. 307/80 |
| 2011/0187189 A1 | 8/2011 | Moussaoui et al. |

FOREIGN PATENT DOCUMENTS

| | | |
|---|---|---|
| JP | 2006-311779 A | 11/2006 |
| WO | WO 2006/133661 A2 | 12/2006 |

OTHER PUBLICATIONS

Chinese Office Action issued Jan. 4, 2015; Chinese Application No. 201310124661.0, with English Translation.

* cited by examiner

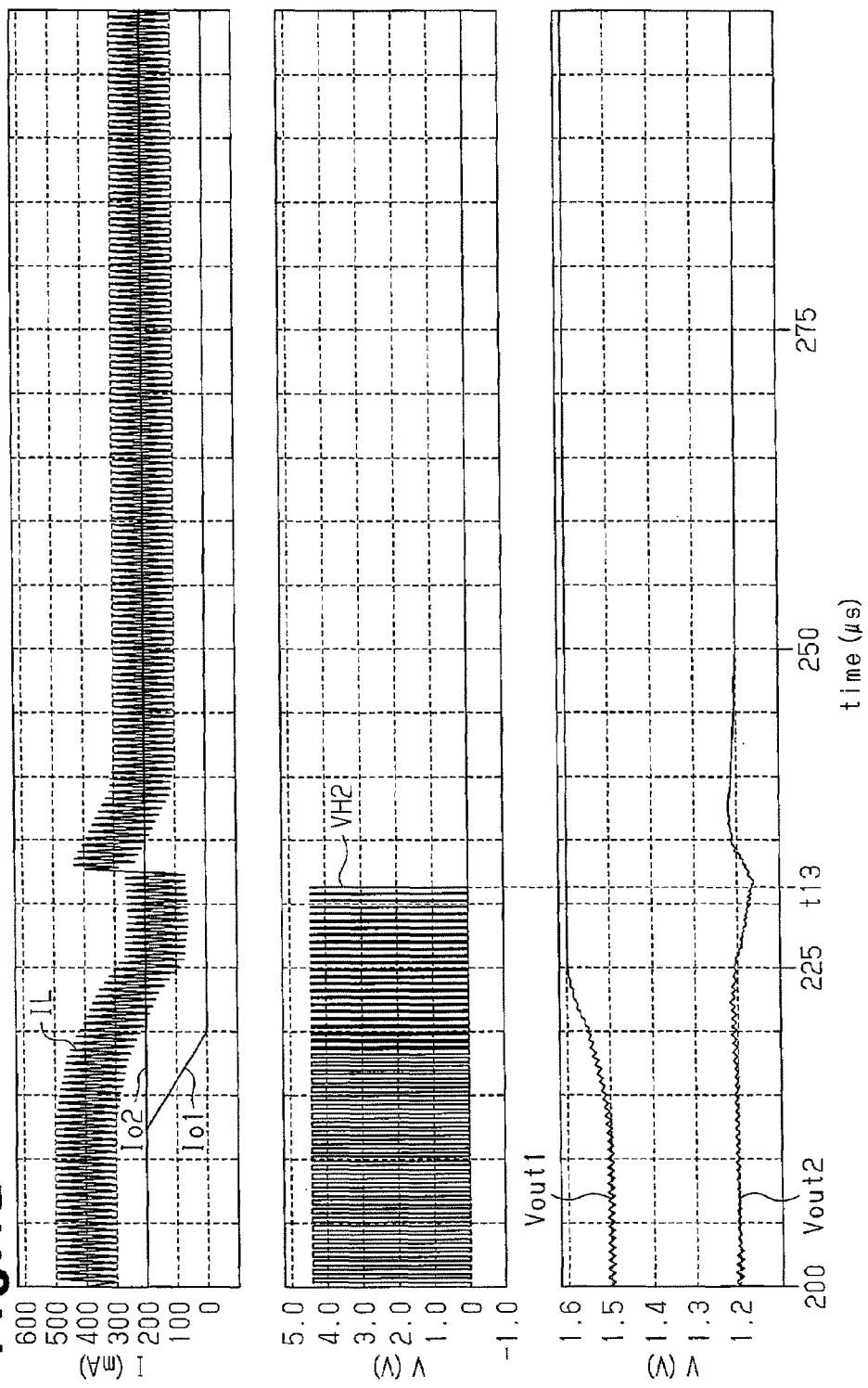

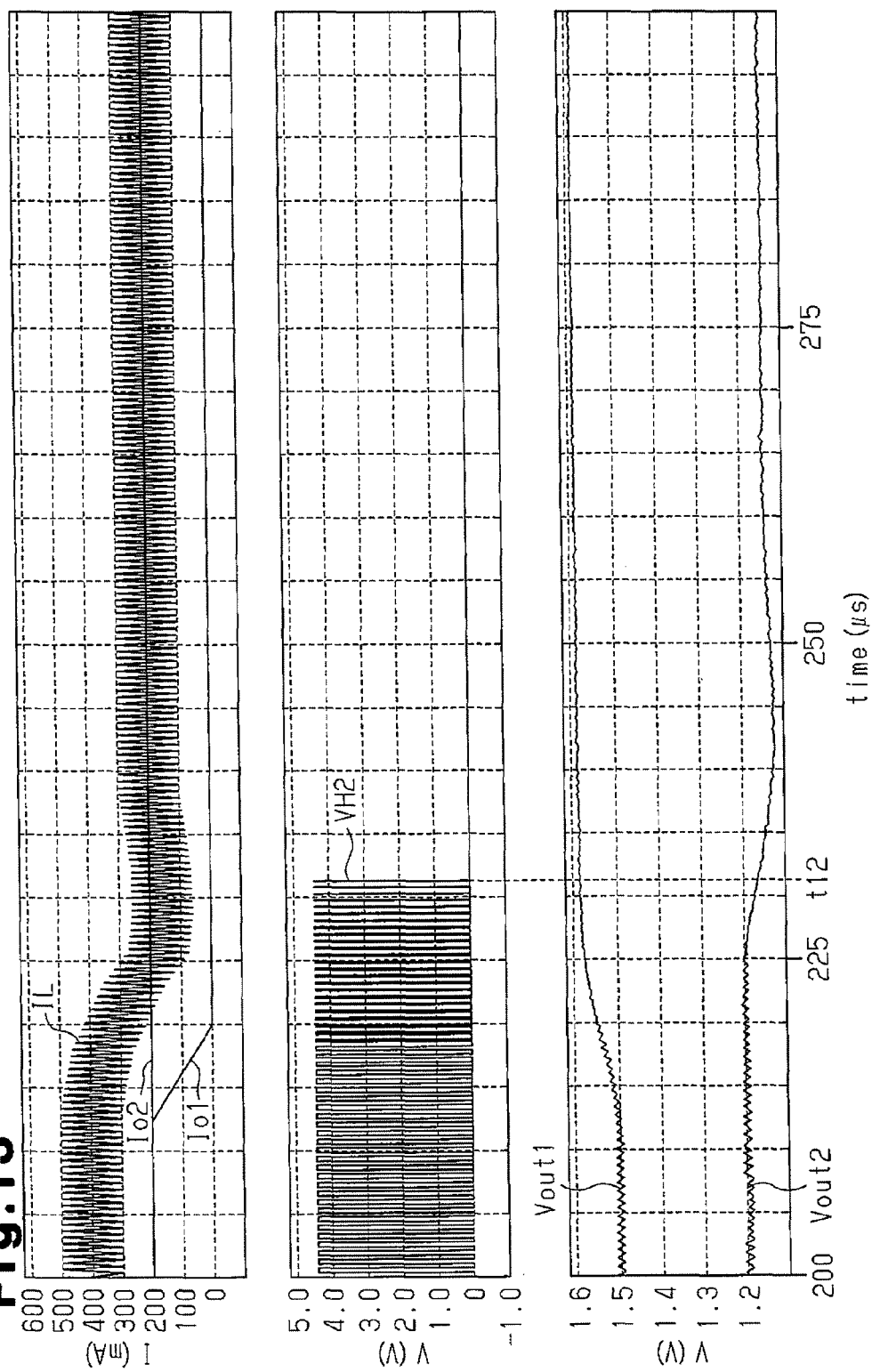

POWER SUPPLY DEVICE AND METHOD FOR CONTROLLING POWER SUPPLY

CROSS-REFERENCE TO RELATED APPLICATIONS

This application is based upon and claims the benefit of priority from prior Japanese Patent Application No. 2012-091978, filed on Apr. 13, 2012, the entire contents of which are incorporated herein by reference.

FIELD

This disclosure relates to a power supply device and a method for controlling a power supply.

BACKGROUND

Electronic devices such as a personal computer, a cell phone, and the like include a switching power supply circuit (DC-DC converter) that supplies a driving voltage to internal circuits that perform signal processing. The switching power supply circuit converts a direct current voltage supplied from, for example, an AC adapter or a battery into a driving voltage suitable for operations of the internal circuits. For example, the switching power supply circuit controls a main switch to turn on and off and generates a direct current output voltage by stepping up or stepping down a direct current input voltage. Further, the switching power supply circuit performs a feedback control to maintain the direct current output voltage supplied to a load at a constant target voltage.

In recent years, a demand for reducing the size of the switching power supply circuit is increasing accompanying a widespread of portable type electronic devices such as a laptop type personal computer, a cell phone, and the like. In order to address such a demand, a single inductor multiple output type (Single Inductor Multiple Output: SIMO) DC-DC converter that may obtain a plurality of outputs from one inductor (coil) is being proposed. In such a type of DC-DC converter, the single inductor is shared to obtain the plurality of outputs. This may suppress an increase in the number of components, accompanying an increase in the number of the outputs, and an increase in a circuit area.

In the multiple output type DC-DC converter, a switching cycle corresponding to each output (load) is allotted beforehand, and power generated in each switching cycle is supplied to the corresponding load. For example, when there are two loads, the switching cycles are alternately allotted to the two loads. Further, in each of the switching cycles, a time during which the main switch is turned on (duty ratio) for causing a current corresponding to an input voltage to flow in the single inductor is adjusted depending on a magnitude of the corresponding load. In order to cause such a DC-DC converter to operate stably, it is preferable to cause a coil current flowing in the inductor to be zero by the time of an end of each switching cycle. That is, in order to cause the DC-DC converter to operate stably, it is preferable to operate in a discontinuous conduction mode (DCM) in which a change in a coil current IL between the switching cycles becomes discontinuous. This is because when the DC-DC converter is operated in a continuous conduction mode (CCM) in which the change in the coil current IL between the switching cycles becomes continuous, energy remaining in the inductor is discharged to another load in a subsequent switching cycle, and an output voltage becomes unstable. However, when the DC-DC converter is operated in the DCM, efficiency is lower than when operating in the CCM.

The single inductor multiple output type DC-DC converter operable in the CCM is described in U.S. Pat. No. 7,538,527, U.S. Pat. No. 7,312,538, U.S. Patent Application Publication No. 2008/0130331, and D. Trevisan et al, "Digital Control of Single-Inductor Multiple-Output Step-Down DC-DC Converters in CCM", IEEE TRANSACTIONS ON INDUSTRAIL ELECTRONICS, Vol. 55, No. 9, September 2008, 3476-3483. FIG. 18 illustrates an example of an SIMO DC-DC converter. A DC-DC converter 6 illustrated in FIG. 18 is a step-down type DC-DC converter of a synchronously rectifying method that generates two output voltages Vo1 and Vo2 that are lower than an input voltage Vi based on the input voltage Vi.

As illustrated in FIG. 18, the DC-DC converter 6 includes a main switch SW11 to which the input voltage Vi is supplied, a synchronization switch SW12, and an inductor (coil) L11 coupled to a coupling node between the switches SW11 and SW12. Further, the DC-DC converter 6 includes output switches SW13 and SW14 coupled to the coil L11, and capacitors C21 and C22 respectively coupled to the output switches SW13 and SW14.

Further, the DC-DC converter 6 includes a circuit 111, which generates a feedback voltage VFB21 corresponding to a combined value of the two output voltages Vo1 and Vo2, and an error amplification circuit 112, which amplifies a voltage difference between the feedback voltage VFB21 and a reference voltage Vr1 to generate an error signal S11.

Further, the DC-DC converter 6 includes a PWM (Pulse Width Modulation) control circuit 113 that controls the switches SW11 and SW12 to turn on and off in a complementary manner based on the error signal S11. Further, the DC-DC converter 6 includes a circuit 114, which includes an error amplification circuit 115 that generates a signal S12 according to a voltage difference between the two output voltages Vo1 and Vo2, and a PWM control circuit 116, which controls the output switches SW13 and SW14 to turn on and off in a complementary manner based on the signal S12.

In this manner, the DC-DC converter 6 controls the input switches SW11 and SW12 based on the combined value of the two output voltages Vo1 and Vo2 and controls the output switches SW13 and SW14 based on the voltage difference between the two output voltages Vo1 and Vo2.

However, in the DC-DC converter 6, a voltage accuracy of the output voltages Vo1 and Vo2 is not satisfactory. This is because the output voltages Vo1 and Vo2 exist on two feedback loops. That is, the output voltages Vo1 and Vo2 are prone to influences of relative variations in all resistors and offset variations in the error amplification circuits 112 and 115. Thus, the voltage accuracy of the output voltages Vo1 and Vo2 is low.

SUMMARY

One aspect of this disclosure is a power supply device. The power supply device includes a coil, a first switch circuit that accumulates energy in the coil, a plurality of second switch circuits that couple the coil to a plurality of output terminals, a first control unit that generates a first control signal for controlling the first switch circuit to turn on and off based on a combined value of a plurality of output voltages respectively output from the plurality of output terminals and a first reference value, and a second control unit that generates a second control signal for controlling the plurality of second switch circuits to turn on and off in a cycle that is the same as the first control signal based on a first output voltage of the plurality of output voltages and a second reference value.

BRIEF DESCRIPTION OF THE DRAWINGS

The embodiment, together with objects and advantages thereof, may best be understood by reference to the following description of the presently preferred embodiments together with the accompanying drawings in which:

FIG. 12 illustrates a simulation result of the operation of the DC-DC converter of the second embodiment;

FIG. 13 illustrates a simulation result of the operation of the DC-DC converter of the first embodiment;

DESCRIPTION OF EMBODIMENTS

A first embodiment will now be described with reference to FIGS. 1 to 6.

Figure 1:
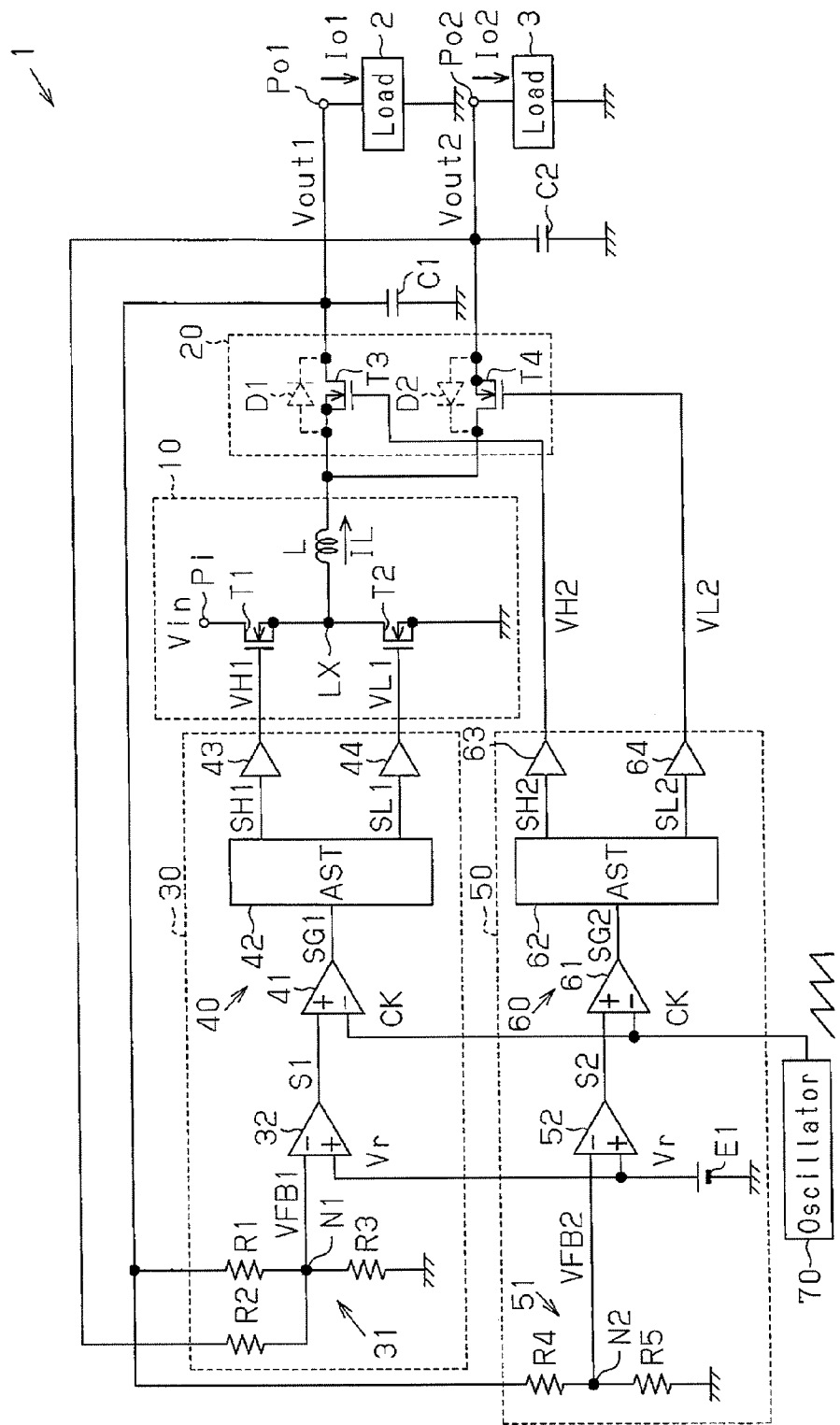
FIG. 1 is a circuit diagram illustrating a DC-DC converter of a first embodiment.

As illustrated in FIG. 1, a DC-DC converter 1 is a single inductor multiple output type DC-DC converter that generates multiple output voltages from one inductor (coil) L. Further, the DC-DC converter 1 is a step-down type DC-DC converter of a synchronously rectifying method that generates two output voltages Vout1 and Vout2, which are lower than an input voltage Vin, based on the input voltage Vin supplied to an input terminal Pi. The output voltage Vout1 is supplied to a load 2 coupled to an output terminal Po1, and the output voltage Vout2 is supplied to a load 3 coupled to an output terminal Po2. Examples of the loads 2 and 3 include an internal circuit of a portable type electronic device (a personal computer, a cell phone, a game device, a digital camera, etc.) and other electronic device, and a rechargeable battery such as a lithium battery and the like installed in a laptop type personal computer. In the present embodiment, for example, the input voltage Vi is set at 10V, a target voltage of the output voltage Vout1 is set at 2V, and a target voltage of the output voltage Vout2 is set at 1V. Thus, a target voltage of a combined voltage Vout1+Vout2 of the output voltages Vout1 and Vout2 is 3V. Hereafter, for the sake of convenience of explanation, the combined voltage Vout1+Vout2 is referred to as a combined voltage Vout.

The DC-DC converter 1 includes a converter unit 10, an output switch circuit 20, capacitors C1 and C2, a first control unit 30, a second control unit 50, and an oscillator 70.

The converter unit 10 has transistors T1 and T2 that are coupled in series between the input terminal Pi, which is supplied with the input voltage Vin, and a power supply line (here, a ground) with a potential lower than the input voltage Vin. The transistor T1 is also referred to as a main transistor, and the transistor T2 is also referred to as a synchronization transistor. The transistors T1 and T2 are, for example, N-channel MOS transistors. The transistor T1 is an example of a first switch circuit that stores energy in the coil L.

The transistor T1 includes a drain (first terminal), which is coupled to the input terminal Pi, and a source (second terminal). The transistor T2 includes a drain (first terminal), which is coupled to the source of the transistor T1, and a source (second terminal) coupled to the ground.

Further, the transistor T1 includes a gate (control terminal) that receives a control signal VH1 supplied from the first control unit 30. The transistor T2 includes a gate (control terminal) that receives a control signal VL1 supplied from the first control unit 30. The control signals VH1 and VL1 turn the transistors T1 and T2 on and off complementarily.

The coil L has a first terminal LX, which is coupled to a coupling node between the two transistors T1 and T2, and a second terminal LY, which is coupled to N-channel MOS transistors T3 and T4 in the output switch circuit 20. Each of the transistors T3 and T4 is an example of a second switch circuit.

The transistor T3 includes a drain (first terminal), which is coupled to the second terminal LY of the coil L, and a source (second terminal), which is coupled to a first terminal of the capacitor C1. Further, the transistor T3 includes a back gate coupled to the drain of the transistor T3. This connection forms a body diode D1 in which a direction from the drain toward the source of the transistor T3 (direction from the coil L toward the output terminal Po1) becomes a forward direction. That is, the body diode D1 has an anode, which is coupled to the second terminal LY of the coil L, and a cathode, which is coupled to the output terminal Po1.

A second terminal of the capacitor C1 is coupled to the ground. The first terminal of the capacitor C1 is coupled to the output terminal Po1. Thus, the output voltage Vout1 that has a potential at the first terminal of the capacitor C1 is supplied from the output terminal Po1 to the load 2. The capacitor C1 is included in a first smoothing circuit that smoothes the output voltage Vout1.

The transistor T4 includes a drain (first terminal), which is coupled to the second terminal LY of the coil L, and a source (second terminal), which is coupled to a first terminal of the capacitor C2. Further, the transistor T4 includes a back gate coupled to the source of the transistor T4. This connection forms a body diode D2 in which a direction from the source toward the drain of the transistor T4 (direction from the output terminal Po2 toward the coil L) becomes a forward direction. That is, the body diode D2 has an anode, which is coupled to the output terminal Po2, and a cathode, which is coupled to the second terminal LY of the coil L.

A second terminal of the capacitor C2 is coupled to the ground. The first terminal of the capacitor C2 is coupled to the output terminal Po2. Thus, the output voltage Vout2 that has a potential at the first terminal of the capacitor C2 is supplied from the output terminal Po2 to the load 3. The capacitor C2 is included in a second smoothing circuit that smoothes the output voltage Vout2.

The transistor T3 includes a gate (control terminal) that receives a control signal VH2 supplied from the second control unit 50. The transistor T4 includes a gate (control terminal) that receives a control signal VL2 supplied from the second control unit 50. The control signals VH2 and VL2 turn the transistors T3 and T4 on and off complementarily.

The output terminal Pot is coupled to the first control unit 30 and the second control unit 50. The output terminal Po2 is coupled to the first control unit 30.

The first control unit 30 controls the transistors T1 and T2 to turn on and off based on a combined value of the output voltages Vout1 and Vout2 (the combined voltage Vout in the present example) and a first reference value (a reference voltage Vr in the present example). The first control unit 30 brings the combined value of the output voltages Vout1 and Vout2 closer to the target voltage (target value). Namely, the first control unit 30 adjusts an on-time of the transistor T1 based on the combined voltage Vout and the reference voltage Vr to supply the desired power to the loads 2 and 3. In the present example, the first control unit 30 generates the control signals VH1 and VL1 having a fixed frequency (cycle) and a pulse width that changes according to the power supplied to the loads 2 and 3. The control signals VH1 and VL1 are respectively supplied to the transistors T1 and T2.

The first control unit 30 includes a first feedback voltage generation circuit 31, an error amplification circuit 32, and a PWM control circuit 40.

The first feedback voltage generation circuit 31 generates a first feedback voltage VFB1 corresponding to the combined voltage Vout obtained by adding the output voltage Vout1 and the output voltage Vout2. The first feedback voltage generation circuit 31 includes resistors R1, R2, and R3. The output terminal Po1 is coupled to a first terminal of the resistor R1, and a second terminal of the resistor R1 is coupled to a first terminal of the resistor R3. Further, the output terminal Po2 is coupled to a first terminal of the resistor R2, and a second terminal of the resistor R2 is coupled to the second terminal of the resistor R1 and the first terminal of the resistor R3. A second terminal of the resistor R3 is coupled to the ground. A node N1 between the resistors R1, R2 and R3 is coupled to an inverted input terminal of the error amplification circuit 32.

In the first feedback voltage generation circuit 31, the resistors R1 and R3 generate a divided voltage by dividing the output voltage Vout1 according to their respective resistance values. The resistors R2 and R3 generate a divided voltage by dividing the output voltage Vout2 according to their respective resistance values. Thus, an added value of the divided voltage of the output voltage Vout1 and the divided voltage of the output voltage Vout2 is generated as the first feedback voltage VFB1 at the node N1. The value of the divided voltage of the output voltage Vout1 depends on a ratio of the resistance values of the resistors R1 and R3 and a potential difference between the output voltage Vout1 and the ground. The value of the divided voltage of the output voltage Vout2 depends on a ratio of the resistance values of the resistors R2 and R3 and a potential difference between the output voltage Vout2 and the ground. Thus, the first feedback voltage generation circuit 31 (resistances R1 to R3) generates the first feedback voltage VFB1 that is proportional to the combined voltage Vout obtained by adding the output voltage Vout1 and the output voltage Vout2. The first feedback voltage VFB1 is supplied to the inverted input terminal of the error amplification circuit 32.

The reference voltage Vr, which is generated by a reference power supply E1, is supplied to a non-inverted input terminal of the error amplification circuit 32. The reference voltage Vr conforms to the first feedback voltage VFB1 when the combined voltage Vout of the output voltages Vout1 and Vout2 reaches a target voltage (standard value).

The error amplification circuit 32 compares the first feedback voltage VFB1 with the reference voltage Vr and amplifies a voltage difference between the two voltages VFB1 and Vr to generate an error signal S1. The error signal S1 is supplied to the PWM control circuit 40.

The PWM control circuit 40 includes a PWM comparison circuit 41, an anti-shoot through (AST) circuit 42, and driver circuits 43 and 44.

The error signal S1 is supplied from the error amplification circuit 32 to a non-inverted input terminal of the PWM comparison circuit 41. A cyclic signal CK having a certain cycle T (see FIG. 2) is supplied from the oscillator 70 to an inverted input terminal of the PWM comparison circuit 41. The cyclic signal CK is, for example, a saw-tooth wave signal. The saw-tooth wave signal has a saw-tooth wave form that is increased from a reference value in accordance with a given rising property, and rapidly falls to the reference value by a reset input.

The PWM comparison circuit 41 compares the error signal S1 with the cyclic signal CK. The PWM comparison circuit 41 generates a PWM signal SG1 having an L level when a level of the cyclic signal CK becomes higher than that of the error signal S1, and generates the PWM signal SG1 having an H level when the level of the cyclic signal CK becomes lower than that of the error signal S1. The PWM signal SG1 has the same cycle as the cycle T. The PWM signal SG1 is supplied to the AST 42.

The AST circuit 42 generates control signals SH1 and SL1 based on the PWM signal SG1 such that the transistors T1 and T2 of the converter unit 10 are turned on and off complementarily, and not turned on at the same time. For example, the AST circuit 42 generates the control signal SH1 having an L level and the control signal SL1 having an H level based on an L level of the PWM signal SG1. Further, the AST circuit 42 generates the control signal SH1 having an H level and the control signal SL1 having an L level based on an H level of the PWM signal SG1.

The control signal SH1 is supplied to the driver circuit 43 from the AST circuit 42. An output terminal of the driver circuit 43 is coupled to the gate of the transistor T1. The driver circuit 43 supplies the control signal VH1 having an H level to the transistor T1 in response to the control signal SH1 having the H level, and supplies the control signal VH1 having an L level to the transistor T1 in response to the control signal SH1 having the L level. The transistor T1 is turned on by the H level of the control signal VH1 and turned off by the L level of the control signal VH1.

A control signal SL1 is supplied to driver circuit 44 from the AST circuit 42. An output terminal of the driver circuit 44 is coupled to the transistor T2. The driver circuit 44 supplies the control signal VL1 having an H level to the transistor T2 in response to the control signal SL1 having the H level, and supplies the control signal VL1 having an L level to the transistor T2 in response to the control signal SL1 having the L level. The transistor T2 is turned on by the H level of the control signal VL1 and turned off by the L level of the control signal VL1.

In the same manner as the PWM signal SG1, the control signals VH1 and VL1 have the same cycle as the cycle T.

Accordingly, the first control unit 30 generates the control signals VH1 and VL1 that control the transistors T1 and T2 to turn on and off complementarily so that the first feedback voltage VFB1 according to the combined voltage Vout approaches the reference voltage Vr. Thus, the combined voltage Vout of the output voltages Vout1 and Vout2 is controlled to approach the target voltage based on the reference voltage Vr and the resistance values of the resistors R1 to R3.

The second control unit 50 controls the transistors T3 and T4 to turn on and off based on the remaining output voltage(s) (first output voltage) among a plurality of output voltages excluding the one output voltage (in the present example, the output voltage Vout1 of the output voltages Vout1 and Vout2) and the second reference value (in the present example, the reference voltage Vr) to approximate the output voltage Vout1 to the target voltage. In other words, the second control unit 50 adjusts an on-time of the transistor T3 based on the output voltage Vout1 and the reference voltage Vr so that the desired power is supplied to the load 2. In the present example, the second control unit 50 generates the control signals VH2 and VL2 having a fixed frequency (cycle) and a pulse width that changes according to the power supplied to the load 2. The control signals VH2 and VL2 are supplied to the transistors T3 and T4, respectively.

The second control unit 50 includes a second feedback voltage generation circuit 51, an error amplification circuit 52, and a PWM control circuit 60.

The second feedback voltage generation circuit 51 generates a second feedback voltage VFB2 corresponding to the output voltage Vout1. The second feedback voltage generation circuit 51 includes resistors R4 and R5. The output terminal Pot is coupled to a first terminal of the resistor R4, and a second terminal of the resistor R4 is coupled to a first terminal of the resistor R5. A second terminal of the resistor R5 is coupled to the ground. A node N2 between the resistors R4 and R5 is coupled to an inverted input terminal of the error amplification circuit 52. Thus, a divided voltage value of the output voltage Vout1 according to resistance values of the resistors R4 and R5 are generated at the node N2 as the second feedback voltage VFB2. The value of the second feedback voltage VFB2 depends on a ratio of the resistance values of the resistors R4 and R5 and a potential difference between the output voltage Vout1 and the ground. Thus, the second feedback voltage generation circuit 51 (resistances R4 and R5) generates the second feedback voltage VFB2 proportional to the output voltage Vout1. The second feedback voltage VFB2 is supplied to the inverted input terminal of the error amplification circuit 52.

The reference voltage Vr is supplied to a non-inverted input terminal of the error amplification circuit 52. The reference voltage Vr conforms to the second feedback voltage VFB2 when the output voltage Vout1 reaches the target voltage (standard value).

The error amplification circuit 52 compares the second feedback voltage VFB2 with the reference voltage Vr and amplifies a voltage difference between the two voltages VFB2 and Vr to generate an error signal S2. The error signal S2 is supplied to the PWM control circuit 60.

The PWM control circuit 60 includes a PWM comparison circuit 61, an AST circuit 62, and driver circuits 63 and 64.

The cyclic signal CK is supplied to an inverted input terminal of the PWM comparison circuit 61. The PWM comparison circuit 61 compares the error signal S2 with the cyclic signal CK. The PWM comparison circuit 61 generates a PWM signal SG2 having an L level when a level of the cyclic signal CK becomes higher than that of the error signal S2, and generates the PWM signal SG2 having an H level when the level of the cyclic signal CK becomes lower than that of the error signal S2. The PWM signal SG2 has the same cycle as the cycle T. Thus, the PWM signal SG1 and the PWM signal SG2 have the same cycle. The PWM signal SG2 is supplied to the AST circuit 62.

The AST circuit 62 generates control signals SH2 and SL2 based on the PWM signal SG2 such that the transistors T3 and T4 of the output switch circuit 20 are turned on and off complementarily, and not turned on at the same time. For example, the AST circuit 62 generates the control signal SH2 having an L level and the control signal SL2 having an H level based on the L level of the PWM signal SG2. Further, the AST circuit 62 generates the control signal SH2 having an H level and the control signal SL2 having an L level based on the H level of the PWM signal SG2.

The control signal SH2 is supplied to the driver circuit 63 from the AST circuit 62. An output terminal of the driver circuit 63 is coupled to the gate of the transistor T3. The driver circuit 63 supplies the control signal VH2 having an H level to the transistor T3 in response to the control signal SH2 having the H level, and supplies the control signal VH2 having an L level to the transistor T3 in response to the control signal SH2 having the L level. The transistor T3 is turned on by the H level of the control signal VH2 and turned off by the L level of the control signal VH2.

A control signal SL2 is supplied to a driver circuit 64 from the AST circuit 62. An output terminal of the driver circuit 64 is coupled to the gate of the transistor T4. The driver circuit 64 supplies the control signal VL2 having an H level to the transistor T4 in response to the control signal SL2 having the H level, and supplies the control signal VL2 having an L level to the transistor T4 in response to the control signal SL2 having the L level. The transistor T4 is turned on by the H level of the control signal VL2 and turned off by the L level of the control signal VL2.

In the same manner as the PWM signal SG2, the control signals VH2 and VL2 have the same cycle as the cycle T.

Accordingly, the second control unit 50 generates the control signals VH2 and VL2 that control the transistors T3 and T4 to turn on and off complementarily so that the second feedback voltage VFB2 according to the output voltage Vout1 approaches the reference voltage Vr. Thus, the output voltage Vout1 is controlled to approach the target voltage based on the reference voltage Vr and resistance values of the resistors R4 and R5.

Next, the operation of the DC-DC converter 1 will now be described.

Figure 2:
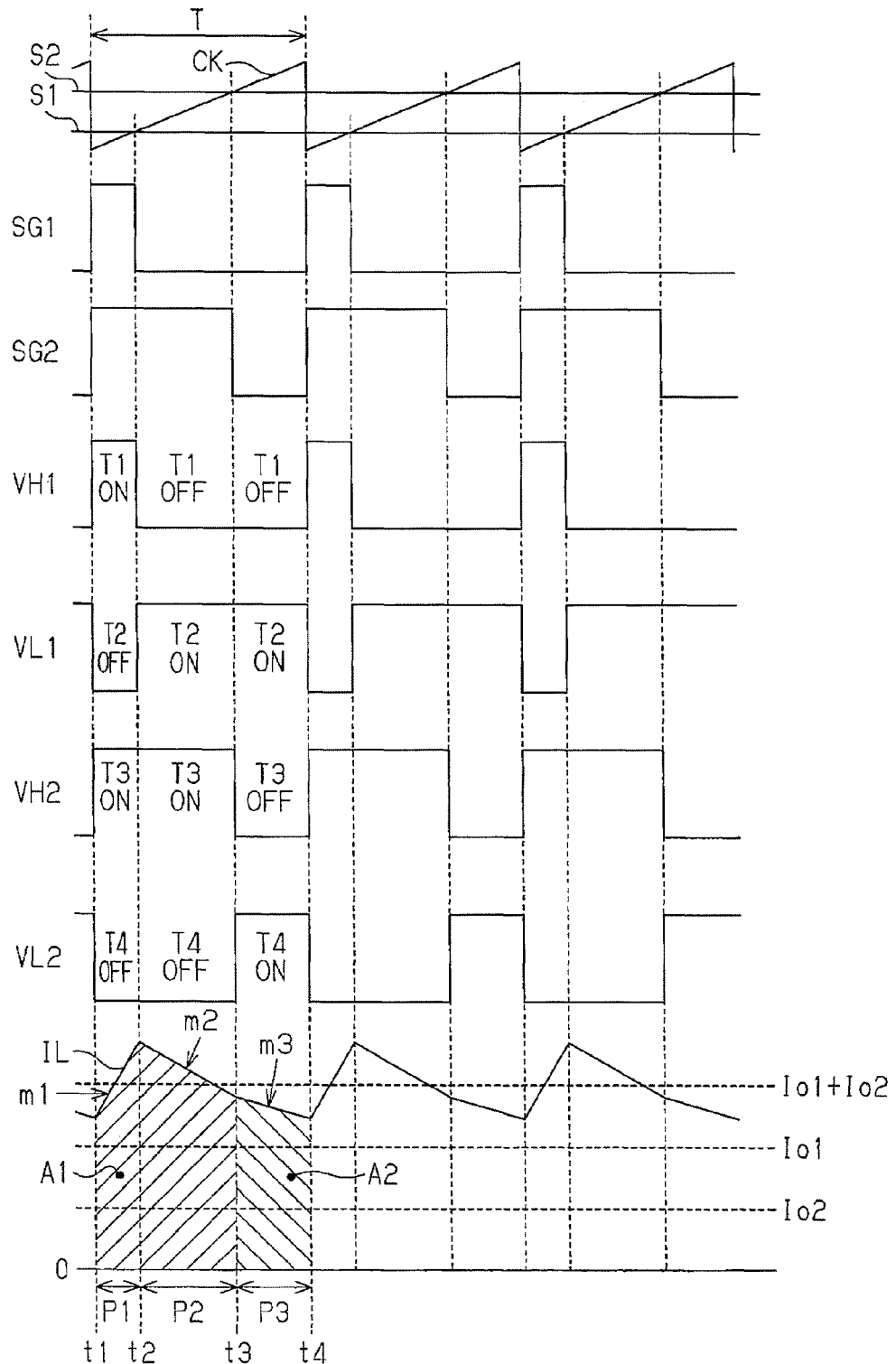
FIG. 2 is a waveform chart illustrating the operation of the DC-DC converter of the first embodiment.
Figure 3A:
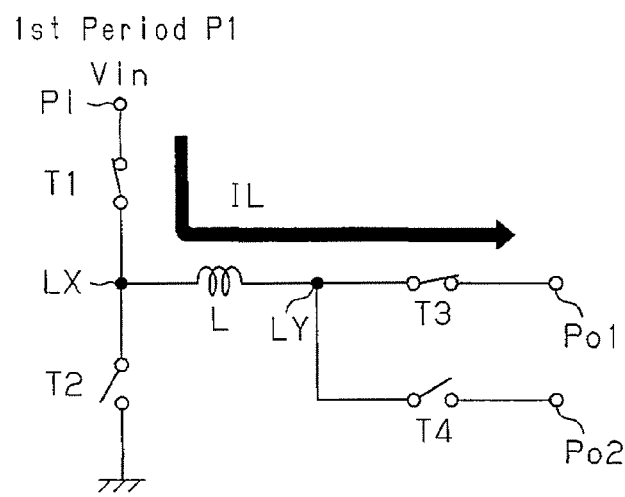
FIGS. 3A to 3C are explanatory diagrams illustrating the operation of the DC-DC converter of the first embodiment.

As illustrated in FIG. 2, at time t1, when the cyclic signal CK is reset to the reference value at the fixed cycle T, the level of the cyclic signal CK becomes lower than those of the error signals S1 and S2. Thus, the PWM comparison circuit 41 generates the PWM signal SG1 having an H level, and the PWM comparison circuit 61 generates the PWM signal SG2 having an H level. As a result, the control signal VH1 having an H level and the control signal VL1 having an L level are generated based on the PWM signal SG1 of the H level, and the control signal VH2 having an H level and the control signal VL2 having an L level are generated based on the PWM signal SG2 of the H level. Thus, the transistor T1 is turned on while the transistor T2 is turned off, and the transistor T3 is turned on while the transistor T4 is turned off. Then, as illustrated in FIG. 3A, the input terminal Pi is coupled to the first terminal LX of the coil L via the transistor T1, and the second terminal LY of the coil L is coupled to the output terminal Po1 via the transistor T3. This forms a current flow passage from the input terminal Pi to the output terminal Po1 through the coil L. During such a state, that is, in a first period P1 from time t1 to time t2 illustrated in FIG. 2, a coil current IL corresponding to the input voltage Vin flows in the coil L, and energy is accumulated in the coil L. In the first period P1, the coil current IL increases at a certain inclination as time passes. An increasing inclination m1 of the coil current IL in the first period P1 is expressed by the following equation 1, where the value of the input voltage Vin is "Vin", the value of the output voltage Vout1 is "Vout1", and an inductance value of the coil L is "L".

[Equation 1]

$$m1 = \frac{Vin - Vout1}{L} \quad (1)$$

That is, the coil current IL in the first period P1 increases proportional to the potential difference between the input voltage Vin and the output voltage Vout1.

Figure 3B:
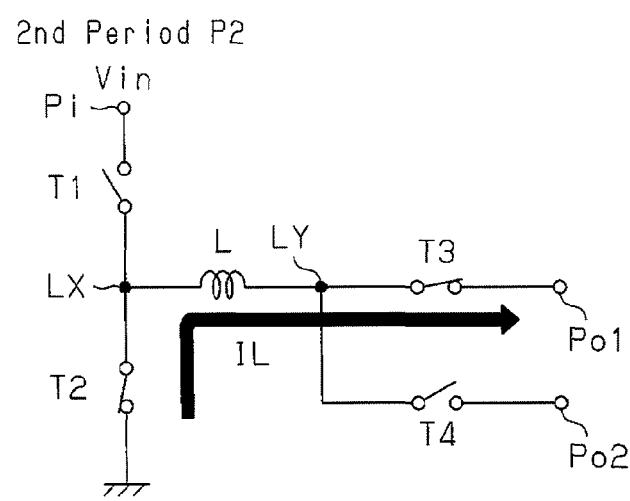

Next, at time t2, when the level of the cyclic signal CK that gradually rises from time t1 by a certain step-up property becomes higher than that of the error signal S1, the PWM comparison circuit 61 generates the PWM signal SG1 having an L level. As a result, the control signal VH1 having an L level and the control signal VL1 having an H level are generated based on the PWM signal SG1 of the L level. Thus, the transistor T1 is turned off and the transistor T2 is turned on. Then, as illustrated in FIG. 3B, the first terminal LX of the coil L is coupled to the ground via the transistor T2, and the second terminal LY of the coil L is coupled to the output terminal Po1 via the transistor T3. This forms a current flow passage from the ground to the output terminal Po1 through the coil L. During such a state, that is, in a second period P2 from time t2 to time t3 illustrated in FIG. 2, the energy accumulated in the coil L during the first period P1 is discharged toward the output terminal Pot, and an induced current flows in the coil L. In the second period P2, the coil current IL decreases at a certain inclination as time passes. A decreasing inclination m2 of the coil current IL in the second period P2 is expressed by the following equation 2.

[Equation 2]

$$m2 = -\frac{Vout1}{L} \quad (2)$$

That is, the coil current IL in the second period P2 decreases proportional to the output voltage Vout1.

Figure 3C:
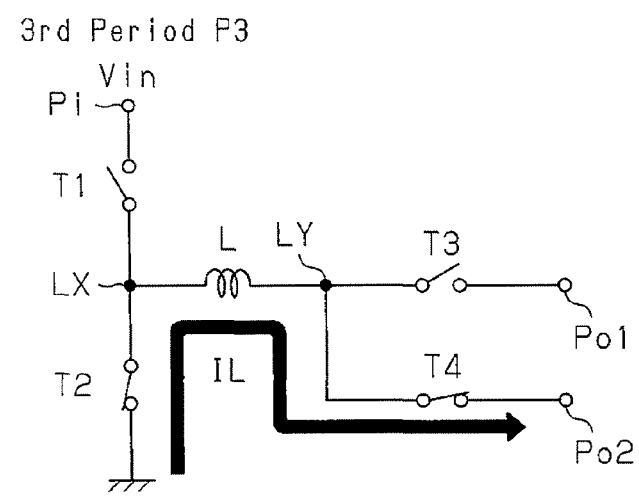
Figure 4:
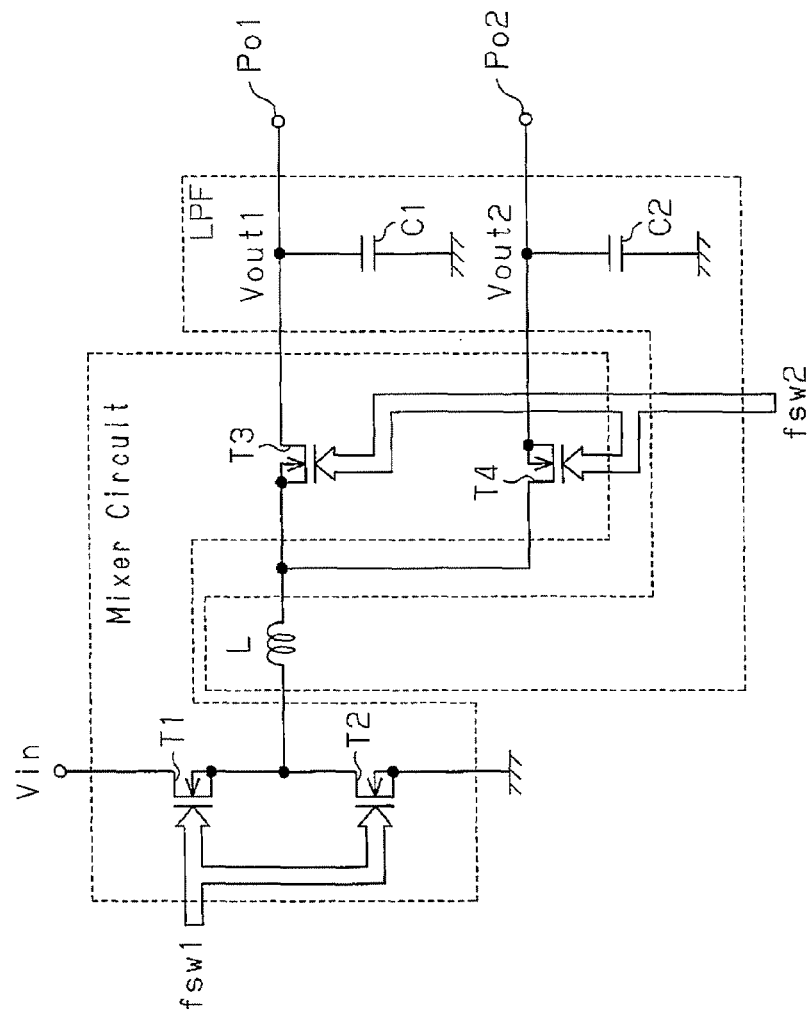
FIG. 4 is an explanatory diagram illustrating the operation of the DC-DC converter of the first embodiment.

Next, at time t3, when the level of the cyclic signal CK becomes higher than that of the error signal S2, the PWM comparison circuit 61 generates the PWM signal SG2 having an L level. As a result, the control signal VH2 having an L level and the control signal VL2 having an H level are generated based on the PWM signal SG2 of the L level. Thus, the transistor T3 is turned off and the transistor T4 is turned on. Then, as illustrated in FIG. 3C, the first terminal LX of the coil L is coupled to the ground via the transistor T2, and the second terminal LY of the coil L is coupled to the output terminal Po2 via the transistor T4. This forms a current flow passage from the ground to the output terminal Po2 through the coil L. During such a state, that is, in a third period P3 from time t3 to time t4 illustrated in FIG. 2, the energy accumulated in the coil L during the first period P1 is discharged toward the output terminal Po2, and an induced current flows in the coil L. In the third period P3, the coil current IL decreases at a certain inclination as time passes. A decreasing inclination m3 of the coil current IL in the third period P3 is expressed by the following equation 3, where the value of the output voltage Vout2 is "Vout2".

[Equation 3]

$$m3 = -\frac{Vout2}{L} \quad (3)$$

That is, the coil current IL in the third period P3 decreases proportional to the output voltage Vout2.

Then, at time t4, when the cyclic signal CK is reset again to the reference value at the fixed cycle T, the transistor T1 is turned on while the transistor T2 is turned off, and the transistor T3 is turned on while the transistor T4 is turned off. Thus, the subsequent cycle T is started, and the first period P1, the second period P2, and the third period P3 take place in this order in the cycle T.

Here, an average value of the coil current IL in each cycle T (each of the first to third periods P1 to P3) corresponds to an added value Io1+Io2 of output currents Io1 and Io2 supplied to the loads 2 and 3. Further, an average value obtained by averaging a total current amount of the coil current IL (see region A1) in the period during which the transistor T3 is turned on (that is, first period P1 and second period P2) by the cycle T corresponds to the output current Io1 supplied to the load 2. Further, an average value obtained by averaging a total current amount of the coil current IL (see region A2) in the period during which the transistor T4 is turned on (that is, third period P3) by the cycle T corresponds to the output current Io2 supplied to the load 3.

Next, a feedback control with the first control unit 30 and the second control unit 50 will now be described in detail. First, the feedback control with the first control unit 30 will now be described.

In the series of operations in each cycle T as described above, when the combined voltage Vout of the output voltages Vout1 and Vout2 becomes higher than the target voltage, that is, when the first feedback voltage VFB1 becomes higher than the reference voltage Vr, the error signal S1 output from the error amplification circuit 32 decreases. Thus, the pulse width of the H level of the control signal VH1 becomes shorter, and thereby the on-time of the transistor T1, that is, the first period P1 of accumulating energy in the coil L becomes shorter. This reduces the current amount of the coil current IL flowing in the coil L in the first period P1 and reduces the energy accumulated in the coil L. As a result, the energy discharged from the coil L to the output terminals Po1 and Po2 in the second period P2 and the third period P3 is reduced. Accordingly, since the total current amount of the coil current IL supplied to the capacitor C1 and the capacitor C2 is reduced, the combined voltage Vout becomes low.

In contrast, when the combined voltage Vout becomes lower than the target voltage, that is, when the first feedback voltage VFB1 becomes lower than the reference voltage Vr, the error signal S1 output from the error amplification circuit 32 rises. Thus, the pulse width of the H level of the control signal VH1 becomes longer, and thereby the first period P1 of accumulating energy in the coil L becomes longer. This increases the current amount of the coil current IL flowing in the coil L in the first period P1 and increases the energy accumulated in the coil L. As a result, the energy discharged from the coil L to the output terminals Po1 and Po2 in the second period P2 and the third period P3 is increased. Accordingly, since the total current amount of the coil current IL supplied to the capacitor C1 and the capacitor C2 is increased, the combined voltage Vout becomes high. By repeating such operation, the combined voltage Vout is maintained at the target voltage (constant value) based on the reference voltage Vr and the resistors R1 to R3.

In this manner, the first control unit 30 controls the on-time of the transistor T1 based on the combined voltage Vout and the reference voltage Vr such that the combined voltage Vout approaches the target voltage based on the reference voltage Vr and the resistors R1 to R3. In other words, in the first control unit 30, the total current amount of the coil current IL (see the regions A1 and A2 illustrated in FIG. 2) is controlled based on the combined voltage Vout and the reference voltage Vr so that the desired current is supplied to the loads 2 and 3, that is, so that the current corresponding to the added value Io1+Io2 of the output currents Io1 and Io2 flows in the coil L.

Next, the feedback control with the second control unit 50 will now be described.

In the series of operations as described above, when the output voltage Vout1 becomes higher than the target voltage, that is, when the second feedback voltage VFB2 becomes higher than the reference voltage Vr, the error signal S2 output from the error amplification circuit 52 decreases. Thus, the pulse width of the H level of the control signal VH2 becomes shorter, and thereby the on-time of the transistor T3, that is, the time during which the second terminal LY of the coil L is coupled to the output terminal Pot (that is, first period P1 and second period P2) becomes shorter. Accordingly, since the time during which the coil current IL is supplied to the capacitor C1 becomes shorter, the output voltage Vout1 becomes low. Here, assuming that the combined voltage Vout of the output voltages Vout1 and Vout2 is constant, when the output voltage Vout1 becomes higher than the target voltage, the output voltage Vout2 becomes lower than the target voltage. In this case, when the error signal S2 output from the error amplification circuit 52 is decreased as described above, the pulse width of the H level of the control signal VL2 becomes longer. As a result, the on-time of the transistor T4, that is, the third period P3 during which the coil current IL is supplied to the capacitor C2 becomes longer. Thus, the output voltage Vout2 becomes high.

In contrast, when the output voltage Vout1 becomes lower than the target voltage, that is, when the second feedback voltage VFB2 becomes lower than the reference voltage Vr, the error signal S2 output from the error amplification circuit 52 rises. Thus, the pulse width of the H level of the control signal VH2 becomes longer, and thereby the on-time of the transistor T3, that is, the time during which the second terminal LY of the coil L is coupled to the output terminal Po1 (that is, first period P1 and second period P2) becomes longer. Accordingly, since the time during which the coil current IL is supplied to the capacitor C1 becomes long, the output voltage Vout1 becomes high. Here, assuming that the combined voltage Vout of the output voltages Vout1 and Vout2 is constant, when the output voltage Vout1 becomes lower than the target voltage, the output voltage Vout2 becomes higher than the target voltage. In this case, when the error signal S2 output from the error amplification circuit 52 is increased as described above, the pulse width of the H level of the control signal VL2 becomes shorter. As a result, the on-time of the transistor T4, that is, the third period P3 during which the coil current IL is supplied to the capacitor C2 becomes shorter. Thus, the output voltage Vout2 becomes low. By repeating such operation, the output voltage Vout1 is maintained at the target voltage (constant value) based on the reference voltage Vr and the resistors R4 and R5. Accordingly, the output voltage Vout2 is also maintained at the target voltage (constant value).

In this manner, the second control unit 50 controls the on-time of the transistor T3 based on the output voltage Vout1 and the reference voltage Vr such that the output voltage Vout1 approaches the target voltage based on the reference voltage Vr and the resistors R4 and R5. In other words, in the second control unit 50, the time range during which the coil current IL is supplied to the capacitor C1 (output terminal Po1) is determined based on the output voltage Vout1 and the reference voltage Vr so that the desired output current Io1 flows to the load 2. The rest of the time in the cycle T excluding the determined time range is not used for generating the feedback signal to the second control unit 50, but is used as time to generate the output voltage Vout2 by supplying the coil current IL to the capacitor C2. Accordingly, in the second control unit 50, a ratio of periods for allotting the coil current IL to the capacitors C1 and C2 (output terminals Po1 and Po2) is controlled based on the output voltage Vout1 among the output voltages Vout1 and Vout2.

Further, since the control signals VH1 and VL1 generated in the first control unit 30 and the control signals VH2 and VL2 generated in the second control unit 50 are signals of the identical cycle (identical frequency), the transistors T1 and T2 and the transistors T3 and T4 are turned on and off at the same switching frequency. Thus, even when causing the DC-DC converter 1 to operate in CCM, the output voltages Vout1 and Vout2 may stably be generated. That is, as illustrated in FIG. 3, it may be regarded that a circuit provided with a mixer circuit, which includes the transistors T1 to T4, and a low pass filter (LPF), which includes the coil L and the capacitors C1 and C2, is provided between the input terminal Pi and the output terminals Pot and Pot. Here, when a frequency fsw1 of a control signal that controls on and off of the transistors T1 and T2 and a frequency fsw2 of a control signal that controls on and off of the transistors T3 and T4 in the mixer circuit are different, low frequency components of fsw1×fsw2 may be exhibited in the output voltages Vout1 and Vout2 in a CCM region. For example, when fsw1=1.5 MHz and fsw2=1.4 MHz, the output voltages Vout1 and Vout2 become unstable by being oscillated at 100 kHz. In contrast, in the DC-DC converter 1 of the present embodiment, since the control signals VH1 and VL1 and the control signals VH2 and VL2 have the identical frequency (cycle time), such low frequency components as above do not occur even in the CCM region. Accordingly, the output voltages Vout1 and Vout2 may stably be generated even in the CCM region.

From another point of view, when the output voltages Vout1 and Vout2 are in a stable state, the first control unit 30 and the second control unit 50 perform the feedback control so that the value of the coil current IL at a starting time (see time t1) of each cycle T and the value of the coil current IL at an ending time (see time t4) of each cycle T are in conformance. That is, the output voltages Vout1 and Vout2 are controlled so that the increase of the coil current IL in the first period P1 and the decrease in the coil current IL in the second period P2 and the third period P3 become equal. The relationship of the increase and the decrease of the coil current IL is expressed by the following equation 4 based on Equations 1 to 3, where the first to third periods P1, P2, and P3 are denoted as "P1", "P2", and "P3", respectively.

[Equation 4]

$$\frac{Vin - Vout1}{L} \times P1 - \frac{Vout1}{L} \times P2 - \frac{Vout2}{L} \times P3 = 0 \quad (4)$$

Further, the relationship of the cycle T and the first to third periods P1, P2, and P3 is expressed by the following equation 5.

[Equation 5]

$$T = P1 + P2 + P3 \quad (5)$$

The time ranges of the first to third periods P1, P2, and P3 are controlled by the feedback control with the first control unit 30 and the second control unit 50 such that the relationships of Equations 4 and 5 are satisfied. That is, the time range of the first period P1 (pulse width of the H level of the control signal VH1) is controlled by the feedback control with the first control unit 30 such that the relationships of Equations 4 and 5 are satisfied, and the time ranges of the second period P2 and the third period P3 (pulse widths of the control signals VH2 and VL2) are controlled by the feedback control with the second control unit 50.

As described above, in the DC-DC converter 1, the total current amount of the coil current IL in a certain cycle T is determined based on the combined voltage Vout of the two output voltages Vout1 and Vout2, and the ratio of the periods for allotting the coil current IL to the capacitors C1 and C2 is determined within the cycle T based only on the output voltage Vout1. Thus, even when there is only one coil L, two output voltages Vout1 and Vout2 within one cycle T may serially be controlled. Thus, even when the value of the output current Io1 and the value of the output current Io2 are different, a stable operation in the CCM region is realized. Further, since the value of the coil current IL at the starting time (see time t1) of each cycle T and the value of the coil current IL at the ending time (see time t4) of each cycle T match as described above, the output voltages Vout1 and Vout2 may more stably be generated even in the CCM region.

Further, the combined voltage Vout of the output voltages Vout1 and Vout2 is maintained at the target voltage by the feedback control with the first control unit 30, and the output voltage Vout1 is maintained at the target voltage by the feedback control with the second control unit 50. Thus, the output voltage Vout2 obtained by subtracting the output voltage Vout1 from the combined voltage Vout is also maintained at the target voltage. Direct current components Vout1 and Vout2 of the output voltages Vout1 and Vout2 are determined in the following equations 6 and 7, when the resistance values of the resistors R1 to R5 are, respectively, denoted as "R1" to "R5", and the voltage value of the reference voltage Vr is denoted as "Vr".

[Equation 6]

$$Vout1 = \frac{R4 + R5}{R5} \times Vr \quad (6)$$

[Equation 7]

$$Vout2 = \frac{R1 \times R3 + R1 \times R2 + R2 \times R3}{R1 \times R3} \times Vr - \frac{R2}{R1} \times Vout1 \quad (7)$$

$$Vout2 = \frac{R1 \times R3 + R1 \times R2 + R2 \times R3}{R1 \times R3} \times Vr - \frac{R2}{R1} \times \frac{R4 + R5}{R5} \times Vr$$

In other words, the value of the reference voltage Vr and the resistance values of the resistors R1 to R5 are set such that the output voltages Vout1 and Vout2 are caused to approach their respective target voltages based on Equations 6 and 7.

Here, as is apparent from Equation 6, the output voltage Vout1 is determined by the voltage setting equation that is the same as when generating one output voltage by one coil. Thus, a voltage accuracy of the output voltage Vout1 is high. That is, since the value of the output voltage Vout1 is controlled by a feedback loop with the second control unit 50, the voltage accuracy of the output voltage Vout1 is determined by variations in the resistors R4 and R5 and an offset variation of the error amplification circuit 52. Accordingly, compared to the output voltage Vout2 that is dependent on a relative variation in the resistors R1 to R5 and the offset variations in the error amplification circuits 32 and 52 existing on two feedback loops, the voltage accuracy of the output voltage Vout1 becomes high. Accordingly, in the DC-DC converter 1 of the present embodiment, the ratio of the periods for allotting the coil current IL to two output terminals Po1 and Po2 is determined according to the output voltage Vout1 among the plurality of output voltages excluding the output voltage Vout2. Thus, the voltage accuracy of the remaining output voltage Vout1 having excluded the output voltage Vout2 may be increased.

The first embodiment has the following advantages.

(1) The total current amount of the coil current IL in the certain cycle T is determined based on two output voltages Vout1 and Vout2, and the ratio of the periods for allotting the coil current IL to the capacitors C1 and C2 is determined within the cycle T based only on the output voltage Vout1. In other words, in the DC-DC converter 1 of the present embodiment, the ratio of the periods for allotting the coil current IL to the output terminals Po1 and Po2 is determined based on the output voltage Vout1 among the plurality of output voltages excluding the output voltage Vout2. Thus, the voltage accuracy of the remaining output voltage Vout1 having excluded the output voltage Vout2 may be increased.

(2) The control signals VH1 and VL1 that control the transistors T1 and T2 to turn on and off and the control signals VH2 and VL2 that control the transistors T3 and T4 to turn on and off have the same cycle. Thus, even in the CCM region, the output voltages Vout1 and Vout2 may stably be generated.

Figure 5:
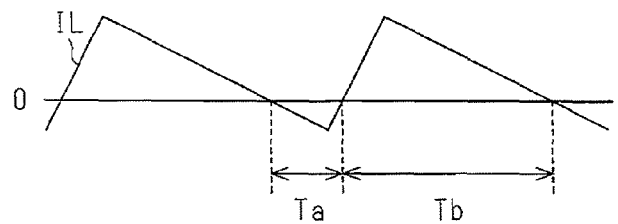
FIG. 5 is a waveform chart illustrating the operation of the DC-DC converter of the first embodiment.

(3) To prevent the transistors T3 and T4 that are controlled to turn on and off complementarily from turning on at the same time, a period of turning off the transistors T3 and T4 at the same time may be intentionally provided. Further, the transistors T3 and T4 may be turn off at the same time due to a delay or the like in the second control unit 50. Further, when the loads 2 and 3 are light, as illustrated in FIG. 5, the coil current IL flows bidirectionally in a minus direction (see period Ta) from the second terminal LY to the first terminal LX and in a plus direction (see period Tb) from the first terminal LX to the second terminal LY. In such cases, when the body diodes of the transistors T3 and T4 are directed only in one direction (for example, direction from an output terminal side toward the coil L), the flow of the coil current IL is hindered when the transistors T3 and T4 are turned off at the same time.

In this regard, the back gate of the transistor T3 coupled to the output terminal Pot (first output terminal), from which the output voltage Vout1 with the highest target voltage (set voltage) among the output voltages Vout1 and Vout2 is output, is coupled to the drain of the transistor T3. Thus, the transistor T3 has the body diode D1 of which the forward direction is the direction from the coil L to the output terminal Po1. Further, the back gate of the transistor T4 coupled to the output terminal Po2 (second output terminal), from which the output voltage Vout2 with the lower target voltage (set voltage) is output, is coupled to the source of the transistor T4. Thus, the transistor T4 has the body diode D2 of which the forward direction is the direction from the output terminal Po2 to the coil L. Accordingly, the body diodes D1 and D2 of the transistors T3 and T4 are coupled in reverse direction to one another. Thus, the current may flow bidirectionally through the body diodes D1 and D2. Accordingly, even when the transistors T3 and T4 are turned off at the same time, since the coil current IL flows through one of the body diodes D1 and D2, the flow of the coil current IL in each of the plus direction and the minus direction is not hindered. Thus, even when the transistors T3 and T4 are turned off at the same time, the stable operation in the CCM region may be realized.

(4) When a body diode of which the forward direction is the direction from the coil L to the output terminal Po2 is formed at the output terminal Po2 from which the output voltage Vout2 with the low target voltage is output, a current flow passage is formed in the body diode due to the potential difference between the output voltages Vout1 and Vout2 when the transistors T3 and T4 are turned off at the same time. In this regard, in the present embodiment, the body diode D1 of which the forward direction is the direction from the coil L to the output terminal Pot is formed at the output terminal Po1 from which the output voltage Vout1 with the highest target voltage is output. Thus, a current flow passage in which current flows through the body diode D1 due to the potential difference between the output voltages Vout1 and Vout2 is not formed. This prevents the output voltages Vout1 and Vout2 from becoming of the same potential. For this reason, it is preferable that a diode component of which the forward direction is the direction from the coil L to the output terminal side be coupled to the output terminal corresponding to the output voltage with the highest target voltage.

Further, such a diode component is preferably coupled to only one output terminal corresponding to the output voltage with the highest target voltage among the plurality of output terminals. This is because when a body diode of which the forward direction is the direction from the coil L to the output terminal Pot is formed for the transistor T4 with the low target voltage, for example, the coil L is electrically coupled to both output terminals Pot and Po2 through the respective body diodes, and thereby the output voltages Vout1 and Vout2 become the same potential.

(5) When the body diode D1 is not present, the second terminal LY of the coil L becomes high voltage momentarily upon when the transistors T3 and T4 are turned off at the same time, and a voltage above the rated voltage may be applied to circuit components. In this regard, by forming the body diode D1 of which the forward direction is the direction from the coil L to the output terminal Pot, the potential of the second terminal LY of the coil L may be suppressed to a potential that is higher than the output voltage Vout1 by a forward directional voltage of the body diode D1 even when the transistors T3 and T4 are turned off at the same time.

(6) During the first period P1 during which the current amount of the coil current IL increases, the second terminal LY of the coil L is coupled to the output terminal Pot from which the output voltage with the small voltage difference with the input voltage Vin (here, the output voltage Vout1) is output. Then, the transistors T3 and T4 are controlled to be turned on and off so that the output voltages Vout1 and Vout2 are sequentially generated in the order by which the potential difference with the input voltage Vin gradually increases. In the present embodiment, firstly, the transistor T3 is turned on and the output terminal Po1 is coupled to the second terminal LY of the coil L. Then, the transistor T4 is turned on and the output terminal Pot is coupled to the second terminal LY of the coil L. This decreases a ripple $\Delta IL$ of the coil current IL.

Figures 6A, 6B:
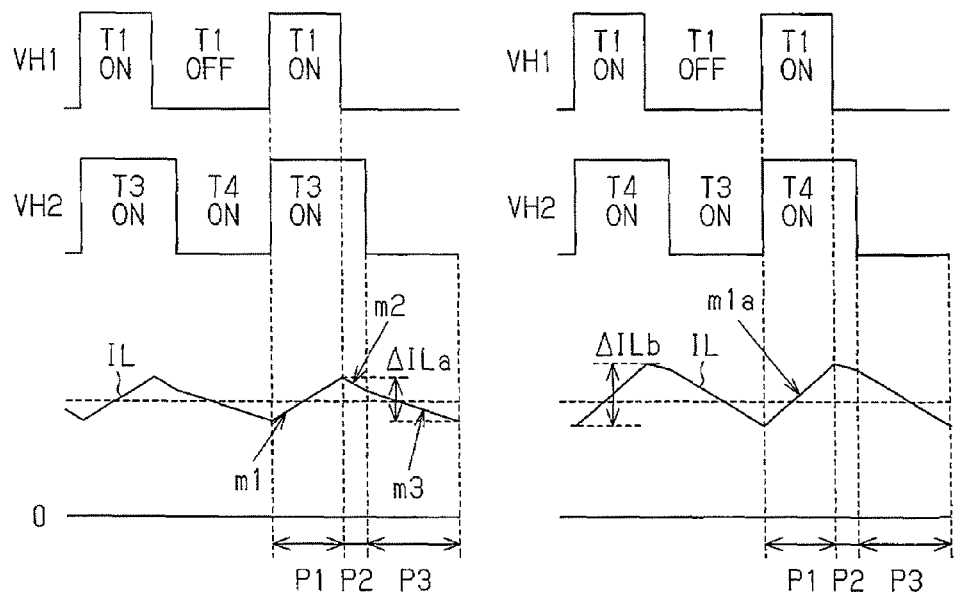
FIGS. 6A and 6B are waveform charts illustrating the operation of the DC-DC converter of the first embodiment.

The effect of reducing the ripple will now be described with reference to FIGS. 6A and 6B. For example, as illustrated in FIG. 6A, in the same manner as the present embodiment, when the control signal VH1 of the H level is output and the transistor T3 is turned on by the control signal VH2 of the H level, the increasing inclination m1 of the coil current IL in the first period P1 becomes (Vin−Vout1)/L (see equation 1). By contrast, as illustrated for example in FIG. 6B, when the control signal VH1 of the H level is output and the transistor T4 is turned on by the control signal VH2 of the H level, the increasing inclination m1a of the coil current IL in the first period P1 becomes (Vin−Vout2)/L. Here, since the relationship of the output voltage Vout1 and the output voltage Vout2 is Vout1>Vout2, the relationship of the increasing inclinations m1 and m1a of the coil current IL becomes m1<m1a. Thus, when the time range of the first period P1 is identical, the relationship of the changing amount of the coil current IL in the first period P1 becomes m1·P1<m1a·P1. Here, as described above, when assuming that the coil current IL at the start and end of each cycle T matches, the amplitude of the coil current IL in the first period P1 corresponds to the ripple $\Delta IL$ of the coil current IL. Accordingly, the relationship of a ripple $\Delta ILa$ of the coil current IL when the transistor T3 is first turned on after the control signal VH1 of the H level is output and a ripple $\Delta ILb$ of the coil current IL when the transistor T4 is first turned on after the control signal VH1 of the H level is output becomes $\Delta ILa < \Delta ILb$. In this manner, after the first period P1 starts and the current amount of the coil current IL increases, the transistor T3 is first turned on so that the output terminal Po1 corresponding to the output voltage Vout1 with the small voltage difference with the input voltage Vin is coupled to the second terminal LY of the coil L. This decreases the ripple $\Delta IL$ of the coil current IL. As a result, power conversion efficiency may be improved.

(7) Stable operation in the CCM region may be achieved by a simple circuit structure, and the accuracy of the output voltage may be improved. In the present embodiment, one coil is omitted compared to the two output type conventional DC-DC converter that arranges a coil for each output, while hardly any other components being added, and the single coil multiple output type DC-DC converter 1 that may stably be operated in the CCM region may be realized. Moreover, the output transistors T3 and T4 are controlled to be turned on and off based on one output voltage Vout1. This simplifies the circuit structure compared to the conventional DC-DC converter that controls the output switch circuits to turn on and off based on the voltage difference between two output voltages, and improves the accuracy of the output voltage Vout1.

Further, the DC-DC converter 1 may be realized by readily using the control circuit (control IC) having two PWM controller used in the two output type conventional DC-DC converter that arranges a coil for each output, and changing the coupling method of the components coupled to the control circuit. That is, the DC-DC converter 1 may realize by using a conventional multi-purpose control circuit.

Application Example of DC-DC Converter

Next, a method of realizing the circuit structure of the DC-DC converter 1 by using the control circuit used in the conventional DC-DC converter will now be described with reference to FIGS. 7 and 8. For the sake of convenience of description, in FIGS. 7 and 8, elements identical to the elements illustrated in FIG. 1 will be given the same reference characters, and detailed description of such elements will be omitted.

First, the structure of a conventional DC-DC converter 5 will now be described.

Figure 8:
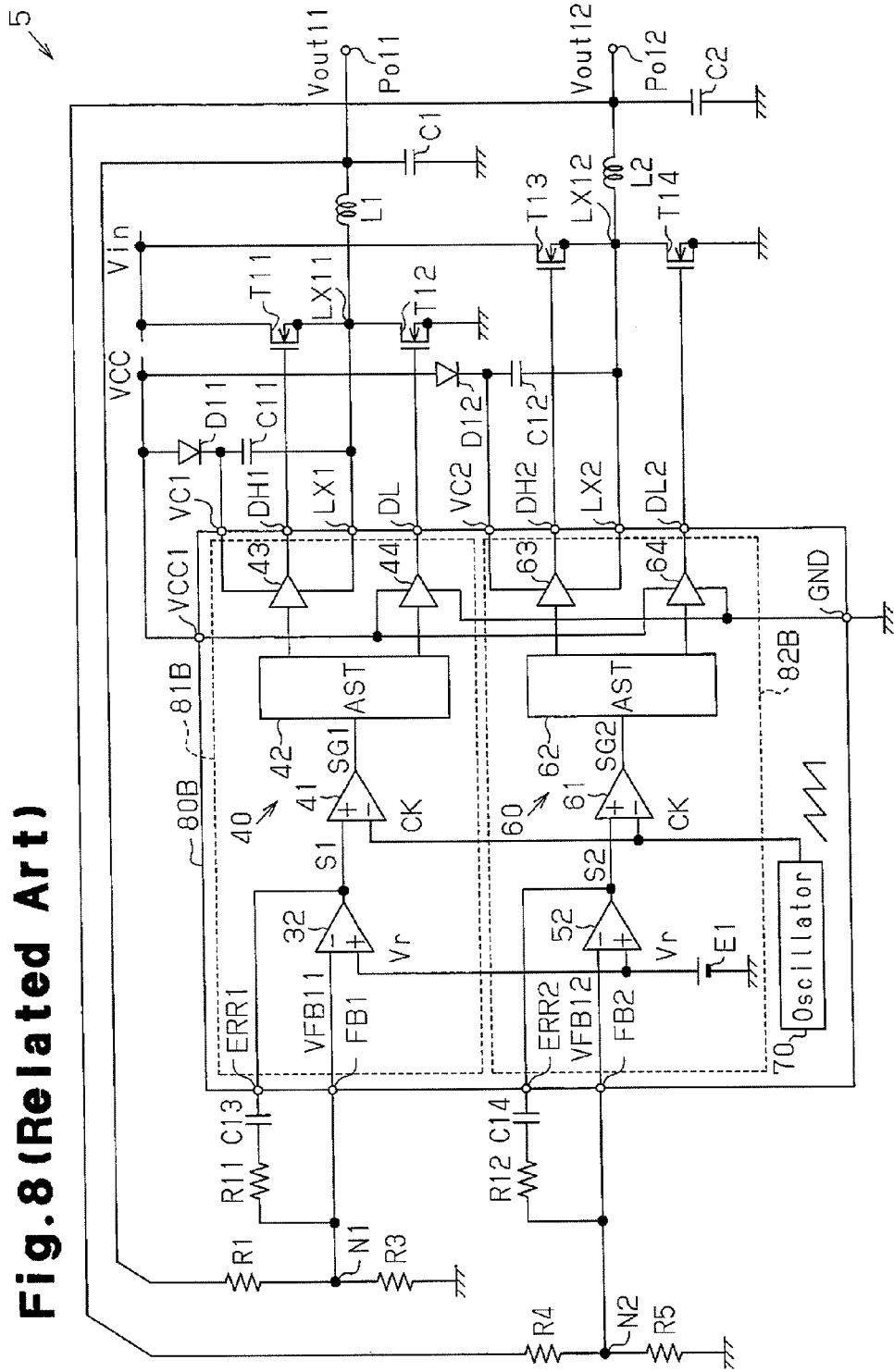
FIG. 8 is a circuit diagram illustrating a DC-DC converter of a related art.

As illustrated in FIG. 8, the DC-DC converter 5 is a two output type DC-DC converter including coils L1 and L2 for output voltages Vout11 and Vout12. The DC-DC converter 5 is a step-down type DC-DC converter of a synchronous rectifying method that generates the output voltages Vout11 and Vout12 that are lower than an input voltage Vin. The DC-DC converter 5 includes a control circuit 80B formed on a semiconductor integrated circuit device of a single-chip type.

The control circuit 80B includes a first control circuit 81B, a second control circuit 82B, and an oscillator 70. The first control circuit 81B includes an error amplification circuit 32 and a PWM control circuit 40, and the second control circuit 82B includes an error amplification circuit 52 and a PWM control circuit 60.

The first control circuit 81B controls N-channel MOS transistors T11 and T12 to turn on and off complementarily based on a feedback voltage VFB11 according to the output voltage Vout11 output from an output terminal Po11 so that the output voltage Vout11 is maintained at a target voltage based on a reference voltage Vr. When the transistor T11 is turned on at a certain cycle based on a cyclic signal CK of the oscillator 70, a coil current corresponding to the input voltage Vin flows in a coil L1 and energy is accumulated in the coil L1. The transistor T11 is turned off when an error signal S1 based on the feedback voltage VFB11 and the reference voltage Vr becomes lower than the cyclic signal CK. Then, the energy accumulated in the coil L1 is discharged toward the output terminal Po11. Here, when the output voltage Vout11 becomes high, an on-time of the transistor T11 becomes shorter due to the error signal S1 being decreased. On the other hand, when the output voltage Vout11 becomes low, an on-time of the transistor T12 becomes longer due to the error signal S1 being increased. By such an operation, the output voltage Vout11 is maintained at the target voltage based on the reference voltage Vr.

In the same manner, the second control circuit 82B controls N-channel MOS transistors T13 and T14 to turn on and off complementarily based on a feedback voltage VFB12 corresponding to the output voltage Vout12 output from an output terminal Po12 so that the output voltage Vout12 is maintained at a target voltage based on the reference voltage Vr.

Next, the structure of a DC-DC converter 1 using the control circuit 80A having the same structure as the control circuit 80B will now be described.

Figure 7:
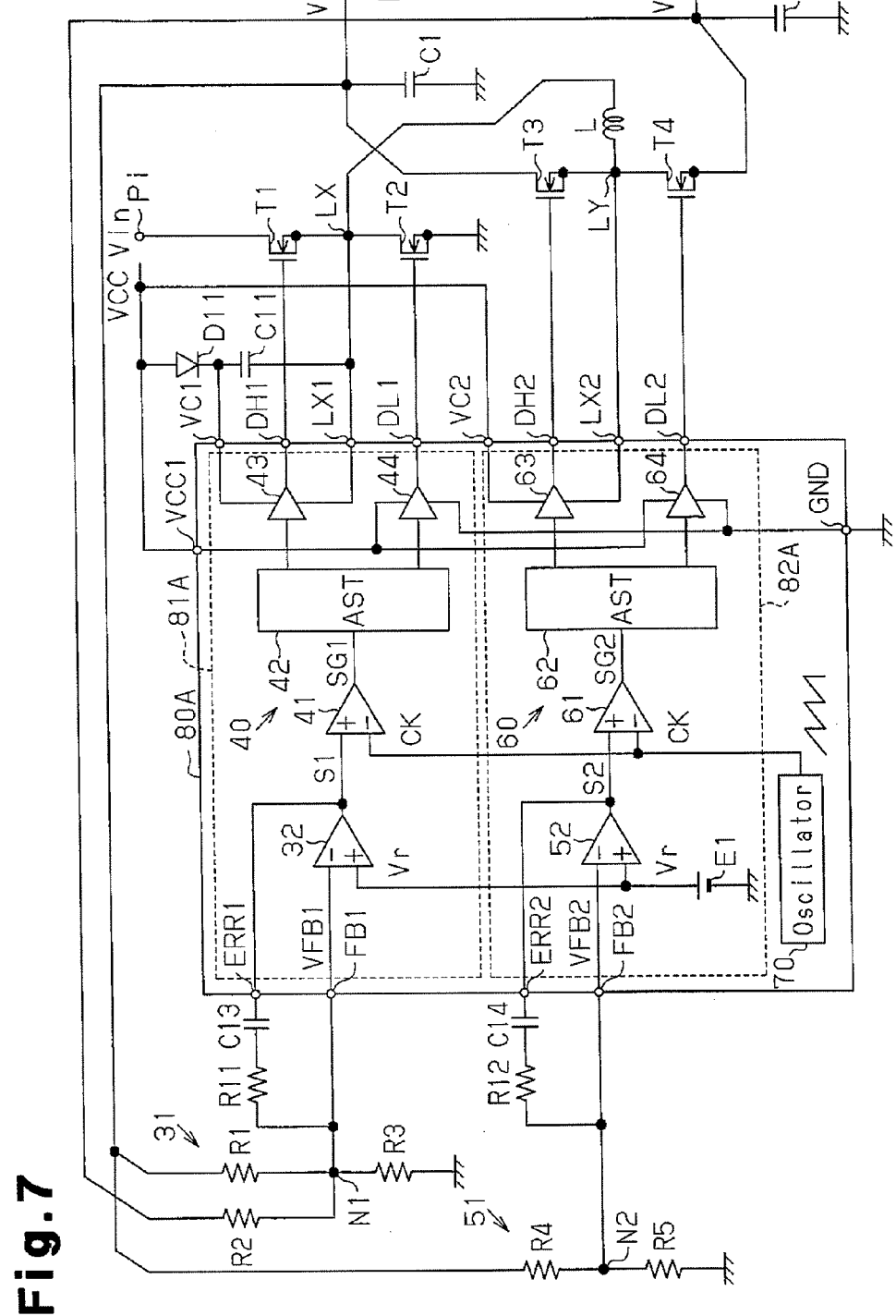
FIG. 7 is a circuit diagram illustrating an application example of the DC-DC converter of the first embodiment.

As illustrated in FIG. 7, the control circuit 80A includes a first control circuit 81A, a second control circuit 82A, and an oscillator 70. The first control circuit 81A and the second control circuit 82A have the same structures as the first control circuit 81B and the second control circuit 82B. That is, the first control circuit 81A includes an error amplification circuit 32 and a PWM control circuit 40, and the second control circuit 82A includes an error amplification circuit 52 and a PWM control circuit 60. Since the first control circuit 81A and the first control circuit 81B are different with respect to their functions, and the second control circuit 82A and the second control circuit 82B are different with respect to their functions, different reference characters are given. Here, coupling relationship of coupling terminals of the control circuit 80A and internal circuit elements will now be described.

A first feedback terminal FB1 of the control circuit 80A is coupled to an input terminal of the first control circuit 81A (in the present example, the inverted input terminal of the error amplification circuit 32). The first feedback terminal FB1 of the present example is a coupling terminal that receives the first feedback voltage VFB1 according to the combined voltage Vout of the output voltages Vout1 and Vout2.

An output terminal of the error amplification circuit 32 is coupled to an error output terminal ERR1 of the control circuit 80A. Further, the output terminal of the error amplification circuit 32 is coupled to a non-inverted input terminal of the PWM comparison circuit 41, and an output terminal of the PWM comparison circuit 41 is coupled to an input terminal of the AST circuit 42. One of output terminals of the AST circuit 42 is coupled to an input terminal of the driver circuit 43, and the other of the output terminals of the AST circuit 42 is coupled to an input terminal of the driver circuit 44.

An output terminal of the high-side driver circuit 43 (output terminal of the first control circuit 81A) is coupled to a driving output terminal DH1 (first driving output terminal) for driving the transistor T1 on a main side. The driving output terminal DH1 is coupled to the gate of the transistor T1. An output terminal of the low-side driver circuit 44 (output terminal of the first control circuit 81A) is coupled to a driving output terminal DL1 for driving the transistor T2 on a synchronization side. The driving output terminal DL1 is coupled to the gate of the transistor T2.

The driver circuit 43 has a high potential power supply terminal coupled to a first power supply terminal VC1 and a low potential power supply terminal coupled to a first coil coupling terminal LX1. The driver circuit 44 has a high potential power supply terminal coupled to a power supply terminal VCC1 and a low potential power supply terminal coupled to a ground terminal GND. A power supply line for supplying a high potential power supply voltage VCC is coupled to the power supply terminal VCC1, and a ground is coupled to the ground terminal GND. A cathode of a diode D11 and a first terminal of a capacitor C11 are coupled to the first power supply terminal VC1. An anode of the diode D11 is coupled to the power supply line, and a second terminal of the capacitor C11 is coupled to the first coil coupling terminal LX1. A charge voltage of the capacitor C11 is supplied to the high potential power supply terminal of the driver circuit 43. The first coil coupling terminal LX1 is coupled to the source (second terminal) of the transistor T1 and the first terminal LX of the single coil L. The drain (first terminal) of the transistor T1 is coupled to an input terminal Pi supplied with the input voltage Vin.

A function of the capacitor C11 will now be described. In order to turn on the N-channel MOS transistor T1, it is preferable to apply a higher voltage to the gate of the transistor T1 than a voltage applied to the source of the transistor T1. When the transistor T1 is turned on, the source and the drain of the transistor T1 both come to be at the input voltage Vin. Thus, when the transistor T1 supplied with the input voltage Vin is an N-channel MOS transistor, it is preferable to generate a gate voltage higher than the input voltage Vin.

The first terminal of the capacitor C11 is coupled to the power supply line via the diode D11. The second terminal of the capacitor C11 is coupled to the first terminal LX of the coil L. Here, the high potential power supply voltage VCC is lower than the input voltage Vin, and a forward direction voltage drop of the diode D11 is set at 0.7 V. When the transistor T1 is turned off and the potential at the first terminal LX comes to be at a ground level, the capacitor C11 is charged to the voltage of VCC−0.7 V via the diode D11. Next, when the transistor T1 is turned on and the voltage at the first terminal LX of the coil L rises to the input voltage Vin, the potential at the second terminal of the capacitor C11 comes to be at the input voltage Vin. Thus, the potential at the first terminal of the capacitor C11 rises to Vin+VCC−0.7 V. Accordingly, the driver circuit 43 of which high potential power supply terminal is supplied with the voltage from the first terminal of the capacitor C11 may receive the voltage that is higher than the source voltage of the transistor T1 by VCC−0.7 V, even when the transistor T2 is in an on state, and when the transistor T1 is in an on state. Thus, the driver circuit 43 may stably drive the gate. Accordingly, the capacitor C11 functions as a boot strap circuit. The diode D11 has a function to prevent a current from flowing toward the power supply line from the capacitor C11 when the potential at the first terminal of the capacitor C11 rises to Vin+VCC−0.7 V.

A second feedback terminal FB2 of the control circuit 80A is coupled to an input terminal of the second control circuit 82A (in the present example, an inverted input terminal of the error amplification circuit 52). The second feedback terminal FB2 of the present example is a coupling terminal that receives the second feedback voltage VFB2 according to the output voltage Vout2.

An output terminal of the error amplification circuit 52 is coupled to an error output terminal ERR2 of the control circuit 80A. Further, the output terminal of the error amplification circuit 52 is coupled to a non-inverted input terminal of the PWM comparison circuit 61, and an output terminal of the PWM comparison circuit 61 is coupled to an input terminal of the AST circuit 62. One of output terminals of the AST circuit 62 is coupled to an input terminal of the driver circuit 63, and the other of the output terminals of the AST circuit 62 is coupled to an input terminal of a driver circuit 64.

An output terminal of the driver circuit 63 (first output terminal of the second control circuit 82A) is coupled to a driving output terminal DH2 (second driving output terminal). The driving output terminal DH2 is coupled to the gate of the transistor T3. An output terminal of the driver circuit 64 (second output terminal of the second control circuit 82A) is coupled to a driving output terminal DL2 (third driving output terminal). The driving output terminal DL2 is coupled to the gate of the transistor T4. In the conventional DC-DC converter 5 illustrated in FIG. 8, the driving output terminal DH2 is arranged to drive the transistor T13 provided on the main side in correspondence with the output voltage Vout12, and the driving output terminal DL2 is arranged to drive the transistor T14 provided on the synchronization side in correspondence with the output voltage Vout12.

As illustrated in FIG. 7, the driver circuit 63 has a high potential power supply terminal coupled to a second power supply terminal VC2 and a low potential power supply terminal coupled to a second coil coupling terminal LX2. The driver circuit 64 has a high potential power supply terminal coupled to the power supply terminal VCC1 and a low potential power supply terminal coupled to the ground terminal GND. A power supply line for supplying the high potential power supply voltage VCC is coupled to the second power supply terminal VC2. In the conventional DC-DC converter 5 illustrated in FIG. 8, a diode D12 and a capacitor C12 having the same functions as the diode D11 and capacitor C11 described above are coupled to the second power supply terminal VC2. The diode D12 and capacitor C12 are arranged to apply a voltage higher than the input voltage Vin to the gate of the transistor T13. In contrast, in the DC-DC converter 1 illustrated in FIG. 7, the transistor T3 driven by the driver circuit 63 may be turned on at all times by the high potential power supply voltage VCC that is lower than the input voltage Vin, regardless of on and off states of other transistors T1, T2, and T4. Thus, in the DC-DC converter 1, the diode D12 and the capacitor C12 may be omitted.

The second coil coupling terminal LX2 is coupled to coupling nodes between drains (first terminals) of the transistors T3 and T4 and the second terminal LY of the single coil L. In the conventional DC-DC converter 5 illustrated in FIG. 8, the first coil coupling terminal LX1 is coupled to the first terminal LX11 of the coil L1, and the second coil coupling terminal LX2 is coupled to the first terminal LX12 of the coil L2. Further, the second terminal of the coil L1 is coupled to the first terminal of the capacitor C11 and the output terminal Po11, and the second terminal of the coil L2 is coupled to the first terminal of the capacitor C12 and the output terminal Po12. In other words, in the DC-DC converter 5, the coil L1 is provided for the output terminal Po11 (output voltage Vout11), and another coil L2 is provided for the output terminal Po12 (output voltage Vout12). In contrast, in the DC-DC converter 1 illustrated in FIG. 7, the first coil coupling terminal LX1 is coupled to the first terminal LX of the coil L, and the second coil coupling terminal LX2 is coupled to the second terminal LY. Further, the source (second terminal) of the transistor T3 is coupled to the first terminal of the capacitor C1 and the output terminal Po1, and the source (second terminal) of the transistor T4 is coupled to the second terminal of the capacitor C2 and the output terminal Po2. By such a connection, a single coil L is shared by two output terminals Po1 and Po2. Thus, there is one coil less than the DC-DC converter 5.

The output terminals Po1 and Po2 are coupled to the first feedback voltage generation circuit 31. An output terminal (node N1) of the first feedback voltage generation circuit 31 is coupled to the first feedback terminal FB1 of the control circuit 80A. In the present example, the output terminal Po1 is coupled to the ground via resistors R1 and R3. The output terminal Po2 is coupled to the ground via resistors R2 and R3. The node N1 between the resistors R1, R2, and R3 is coupled to the first feedback terminal FB1 of the control circuit 80A. Thus, the first feedback voltage VFB1 according to the combined voltage Vout of the output voltages Vout1 and Vout2 is supplied to the first feedback terminal FB1. In the DC-DC converter 5 illustrated in FIG. 8, the feedback voltage VFB11 is generated based on the output voltage Vout11 among the output voltages Vout11 and Vout12. Thus, the DC-DC converter 1 has the resistor R2 added to the DC-DC converter 5. However, as described above, since in the DC-DC converter 1 the diode D12, the capacitor C12, and one coil may be omitted from the DC-DC converter 5, a circuit area may significantly be reduced when comparing the converters 1 and 5 as a whole. Especially, since a coil of which downsizing is difficult among various circuit elements may be omitted, significant reduction of the circuit area and cost reduction may be realized.

Further, in the present example, the node N1 is coupled also to the first terminal of a resistor R11, and a second terminal of the resistor R11 is coupled to a first terminal of a capacitor C13. A second terminal of the capacitor C13 is coupled to the error output terminal ERR1 of the control circuit 80A. Thus, the output terminal of the error amplification circuit 32 in the first control circuit 81A is fed back to the inverted input terminal of the error amplification circuit 32 via the capacitor C13 and the resistor R11. A gain of the error amplification circuit 32 is determined by the resistors R1, R2, R3, and R11 and the capacitor C13.

The output terminal Po1 is coupled to the second feedback voltage generation circuit 51. In the present example, the output terminal Po1 is coupled to the ground via resistors R4 and R5. A node N2 between the resistors R4 and R5 (output terminal of the second feedback voltage generation circuit 51) is coupled to the second feedback terminal FB2 of the control circuit 80A. Thus, the second feedback voltage VFB2 according to the output voltage Vout1 is supplied to the second feedback terminal FB2. In the DC-DC converter 5, in order to generate the feedback voltage VFB12 according to the output voltage Vout12, the output terminal Po12 is coupled to a first terminal of the resistor R4.

Further, in the present example, the node N2 is coupled also to a first terminal of a resistor R12, and a second terminal of the resistor R12 is coupled to a first terminal of a capacitor C14. A second terminal of the capacitor C14 is coupled to the error output terminal ERR2 of the control circuit 80A. Thus, an output terminal of the error amplification circuit 52 in the second control circuit 82A is fed back to an inverted input terminal of the error amplification circuit 52 via the capacitor C14 and the resistor R12. A gain of the error amplification circuit 52 is determined by the resistors R4, R5, and R12 and the capacitor C14.

As described above, the DC-DC converter 1 may be configured by utilizing the control circuit 80A, which is identical to the control circuit 80B used in the conventional DC-DC converter 5, and hardly making any changes to the circuit elements that are externally attached to the control circuit 80A. Besides, the DC-DC converter 1 may achieve the superior advantages of (1) to (6) as described above.

A second embodiment will now be described with reference to FIGS. 9 to 13. A DC-DC converter 1A of the second embodiment differs from the first embodiment in that the structure of the first feedback voltage generation circuit are modified and that a detection circuit 90 is added. Hereafter, the differences from the first embodiment will be described. Elements identical to the members illustrated previously in FIGS. 1 to 8 will be given the same reference characters, and a detailed description of such elements will be omitted.

Figure 9:
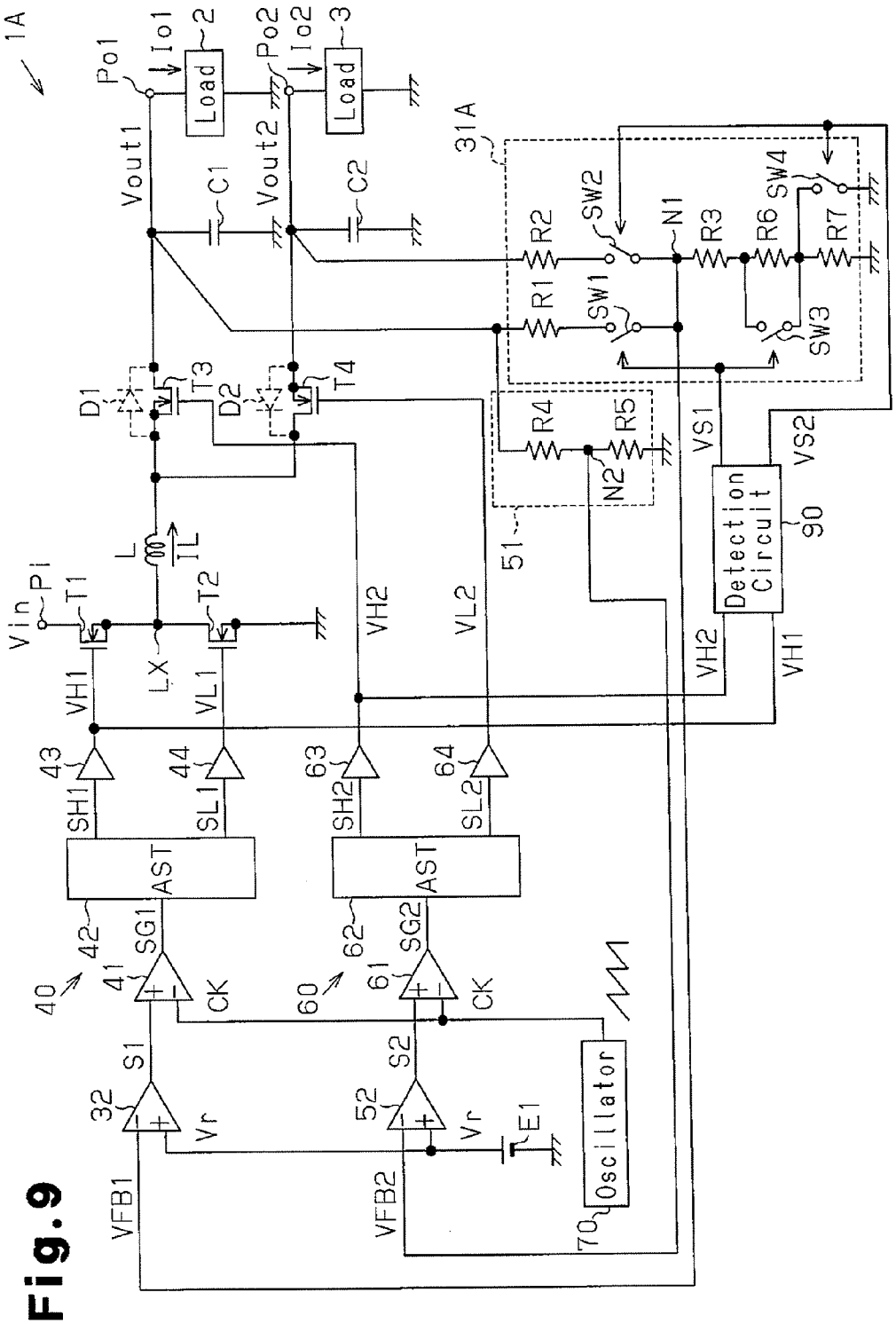
FIG. 9 is a circuit diagram illustrating a DC-DC converter of a second embodiment.

As illustrated in FIG. 9, a first feedback voltage generation circuit 31A in the first control unit includes resistors R1, R2, R3, R6, and R7 and switches SW1, SW2, SW3, and SW4.

The resistor R1 has a first terminal coupled to the output terminal Po1 and a second terminal coupled to a first terminal of the switch SW1. A second terminal of the switch SW1 is coupled to a node N1. The resistor R2 has a first terminal coupled to the output terminal Pot and a second terminal coupled to a first terminal of the switch SW2. A second terminal of the switch SW2 is coupled to the node N1. A detection signal VS1 from the detection circuit 90 is supplied to a control terminal of the switch SW1, and a detection signal VS2 from the detection circuit 90 is supplied to a control terminal of the switch SW2. The detection signal VS1 controls the switch SW1 to turn on and off, and the detection signal VS2 controls the switch SW2 to turn on and off. The switches SW1 and SW2 couple and decouple the node N1, which functions as a combining circuit that combines the output voltages Vout1 and Vout2, and the output terminals Po1 and Pot. The switches SW1 and SW2 are, for example, N-channel MOS transistors.

The resistor R3 has a first terminal coupled to the node N1 and a second terminal coupled to a first terminal of the resistor R6. A second terminal of the resistor R6 is coupled to a first terminal of the resistor R7, and a second terminal of the resistor R7 is coupled to the ground. The switch SW3 is coupled with the resistor R6 in parallel, and the switch SW4 is coupled with the resistor R7 in parallel. The detection signal VS1 is supplied to a control terminal of the switch SW3, and the detection signal VS2 is supplied to a control terminal of the switch SW4. The detection signal VS1 controls the switch SW3 to turn on and off, and the detection signal VS2 controls the switch SW4 to turn on and off. The switches SW3 and SW4 are, for example, N-channel MOS transistors.

The control signals VH1 and VH2 are supplied to the detection circuit 90. The detection circuit 90 detects whether a duty of the control signal VH2 is 0% or 100% based on the control signals VH1 and VH2. Based on the detection result, the detection circuit 90 generates a detection signal VS1 that controls the switches SW1 and SW3 to turn on and off and a detection signal VS2 that controls the switches SW2 and SW4 to turn on and off.

For example, when detecting that the duty of the control signal VH2 is 0%, the detection circuit 90 generates the detection signal VS1 having an L level to turn the switches SW1 and SW3 off, and generates the detection signal VS2 having an H level to turn the switches SW2 and SW4 on. Here, when the duty of the control signal VH2 is 0%, the transistor T3 is in a state of being turned off at all times within one cycle of the control signal VH1. Thus, when detecting that the transistor T3 is not turned on within one cycle of the control signal VH1, the detection circuit 90 generates the detection signal VS1 of the L level for turning the switches SW1 and SW3 off.

In this case, in the first feedback voltage generation circuit 31A, the switch SW1 is turned off by the detection signal VS1 of the L level, and the output terminal Po1, which is coupled to the transistor T3 that is not turned on, is decoupled from the node N1. Thus, the output terminal Po1 is decoupled from a feedback loop of the first control unit including the first feedback voltage generation circuit 31A, the error amplification circuit 32, and the PWM control circuit 40. The output terminal Po2 is coupled to the ground via the resistor R2, the switch SW2 in the on state, the resistor R3, the resistor R6, and the switch SW4 in the on state. The resistor R6 is set at a resistance value for maintaining the output voltage Vout2 at the target voltage. Thus, the resistor R6 and the switch SW3 function as a circuit for adjusting the output voltage Vout2 to the target voltage.

Further, the first feedback voltage generation circuit 31A generates the first feedback voltage VFB1 according to only the output voltage Vout2 among the output voltages Vout1 and Vout2. Then, the error amplification circuit 32 and the PWM control circuit 40 control the transistors T1 and T2 to turn on and off so that the first feedback voltage VFB1 approaches the reference voltage Vr. Thus, the output voltage Vout2 is maintained at the target voltage that is based on the reference voltage Vr and the resistors R2, R3, and R6.

When detecting that the duty of the control signal VH2 is 100%, the detection circuit 90 generates the detection signal VS2 having an L level to turn the switches SW2 and SW4 off, and generates the detection signal VS1 having an H level to turn the switches SW1 and SW3 on. Here, when the duty of the control signal VH2 is 100%, the transistor T3 is in the state of being turned on at all times within one cycle of the control signal VH1. Thus, when detecting that the transistor T3 is not turned off within one cycle of the control signal VH1, the detection circuit 90 generates the detection signal VS2 of the L level for turning the switches SW2 and SW4 off.

In this case, in the first feedback voltage generation circuit 31A, the switch SW2 is turned off by the detection signal VS2 of the L level, and the output terminal Po2, which is coupled to the transistor T4 that is other than the transistor T3 that is not turned off, is decoupled from the node N1. Thus, the output terminal Po2 is decoupled from the feedback loop of the first control unit including the first feedback voltage generation circuit 31A, the error amplification circuit 32, and the PWM control circuit 40. The output terminal Po1 is coupled to the ground via the resistor R1, the switch SW1 in the on state, the switch SW3 in the on state, and the resistor R7. The resistor R7 is set at a resistance value for maintaining the output voltage Vout1 at the target voltage. Thus, the resistor R7 and the switch SW4 function as a circuit for adjusting the output voltage Vout1 to the target voltage.

Further, the first feedback voltage generation circuit 31A generates the first feedback voltage VFB1 according to only the output voltage Vout1 among the output voltages Vout1 and Vout2. Then, the error amplification circuit 32 and the PWM control circuit 40 control the transistors T1 and T2 to turn on and off so that the first feedback voltage VFB1 approaches the reference voltage Vr. Thus, the output voltage Vout1 is maintained at the target voltage that is based on the reference voltage Vr and the resistors R1, R3, and R7.

Next, an example of the internal structure of the detection circuit 90 will now be described.

Figure 10:
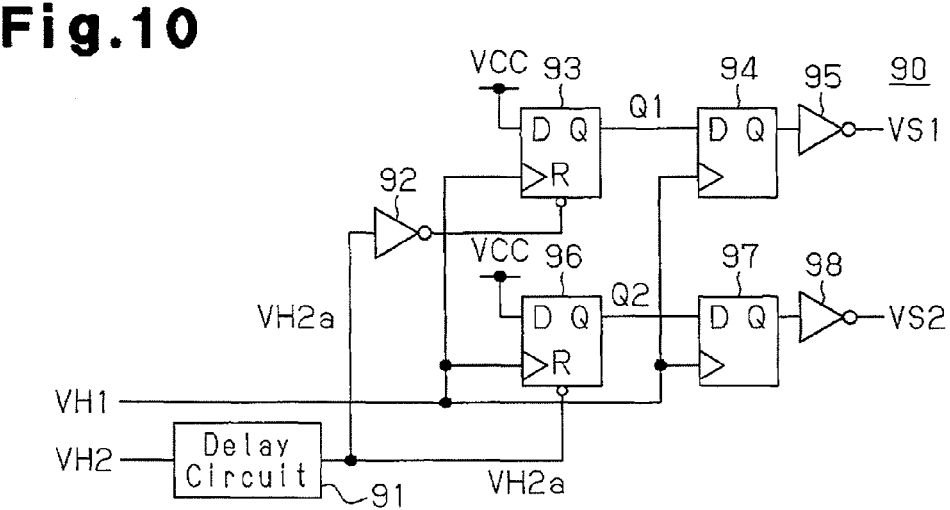
FIG. 10 is a circuit diagram illustrating an example of an internal configuration of a detection circuit.

As illustrated in FIG. 10, the detection circuit 90 includes a delay circuit 91, an inverter circuit 92, D-flip flop circuits (D-FF circuits) 93 and 94, an inverter circuit 95, D-FF circuits 96 and 97, and an inverter circuit 98.

The delay circuit 91 supplies a delay signal VH2a, which is delayed from the control signal VH2 by a given time (micro time), to the inverter circuit 92 and a reset terminal R of the D-FF circuit 96. The inverter circuit 92 supplies a logically inverted signal of the delay signal VH2a to a reset terminal R of the D-FF circuit 93.

A high potential power supply voltage VCC generated by a power supply circuit that is not illustrated is supplied to an input terminal D of the D-FF circuit 93. The control signal VH1 is input to a clock terminal of the D-FF circuit 93. An output signal Q1 is output from an output terminal Q of the D-FF circuit 93 and supplies to an input terminal D of the D-FF circuit 94 of a subsequent stage.

The control signal VH1 is also input to a clock terminal of the D-FF circuit 94. An output signal is output from an output terminal Q of the D-FF circuit 94 and supplies to the inverter circuit 95. The inverter circuit 95 outputs a logically inverted signal of the output signal of the D-FF circuit 94 as the detection signal VS1.

The D-FF circuits 93 and 94 and the inverter circuits 92 and 95 function as a first detection circuit that generates the detection signal VS1 (first detection signal) when detecting that the transistor T3 is not turned on within one cycle of the control signal VH1.

The high potential power supply voltage VCC is supplied to an input terminal D of the D-FF circuit 96, and the control signal VH1 is input to a clock terminal of the D-FF circuit 96. An output signal Q2 is output from an output terminal Q of the D-FF circuit 96 and supplied to an input terminal D of the D-FF circuit 97 of a subsequent stage.

The control signal VH1 is input to a clock terminal of the D-FF circuit 97. An output signal is output from an output terminal Q of the D-FF circuit 97 and supplied to the inverter circuit 98. The inverter circuit 98 outputs a logically inverted signal of the output signal of the D-FF circuit 97 as the detection signal VS2.

The D-FF circuits 96 and 97 and the inverter circuit 98 function as a second detection circuit that generates the detection signal VS2 (second detection signal) when detecting that the transistor T3 is not turned off within one cycle of the control signal VH1.

Next, the operation of the detection circuit 90 will now be described. First, the operation of the detection circuit 90 when the duty of the control signal VH2 becomes 0% will now be described.

Figure 11A:
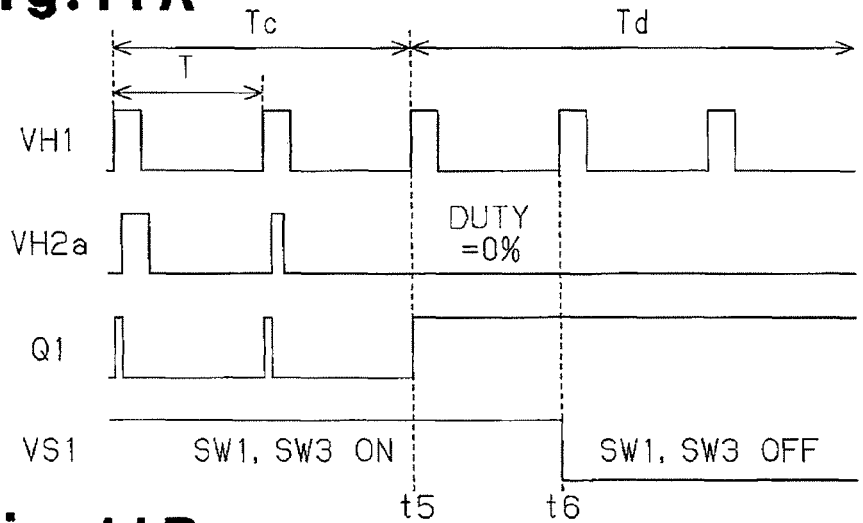
FIGS. 11A and 11B are waveform charts illustrating the operation of the detection circuit.

As illustrated by a period Tc in FIG. 11A, when a pulse of the delay signal VH2a having an H level is generated in one cycle T of the control signal VH1, the delay signal VH2a of the H level resets the D-FF circuit 93. This sets the output signal Q1 to be at the L level. Thus, upon a rise of the control signal VH1 in a subsequent cycle T, the output signal Q1 of the D-FF circuit 93 comes to be at the L level. Accordingly, an output signal having an L level is output from the D-FF circuit 94, and the detection signal VS1 of the H level is output from the inverter circuit 95. Then, the switches SW1 and SW3 are turned on by the detection signal VS1 of the H level.

In contrast, as in a period Td, when the pulse of the delay signal VH2a having an H level is not generated in one cycle T of the control signal VH1, that is, when the duty of the control signal VH2 comes to be at 0%, the D-FF circuit 93 is not reset in the cycle T. Thus, the output signal Q1 that became the H level (see time t5) in response to the rise of the control signal VH1 does not transition to the L level, and the output signal Q1 of the D-FF circuit 93 comes to be at the H level upon the rise of the control signal VH1 in the subsequent cycle T (see time t6). Accordingly, the output signal having an H level is output from the D-FF circuit 94 in response to the rising edge of the control signal VH1, and the detection signal VS1 having an L level is output from the inverter circuit 95. Then, the switches SW1 and SW3 are turned off by the detection signal VS1 of the L level.

Next, the operation of the detection circuit 90 when the duty of the control signal VH2 becomes 100% will now be described.

Figure 11B:
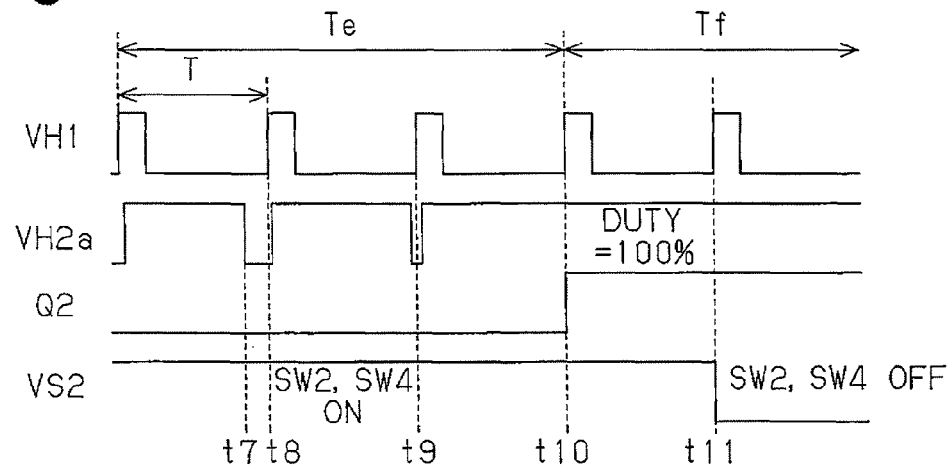

As illustrated by a period Te in FIG. 11B, when a pulse of the delay signal VH2a having an L level is generated in one cycle T of the control signal VH1, the delay signal VH2a of the L level resets the D-FF circuit 96 (see time t7). Even when the control signal VH1 rises during when the D-FF circuit 96 is being reset (see time t8), the output signal Q2 of the D-FF circuit 96 is maintained at the L level. Thus, the output signal Q2 of the D-FF circuit 96 comes to be at the L level upon the rise of the control signal VH1 in the subsequent cycle T (see time t9). Accordingly, the output signal having an L level is output from the D-FF circuit 97, and the detection signal VS2 having an H level is output from the inverter circuit 98. Then, the switches SW2 and SW4 are turned on in response to the detection signal VS2 having an H level.

In contrast, as in a period Tf, when the pulse of the delay signal VH2a having an L level is not generated in one cycle T of the control signal VH1, that is, when the duty of the control signal VH2 comes to be at 100%, the D-FF circuit 96 is not reset in the cycle T. Thus, the output signal Q2 comes to be at the H level in response to the rise of the control signal VH1 (see time t10), and the H level of the output signal Q2 is maintained until the next cycle T. Thus, an output signal having an H level is output from the D-FF circuit 97 in response to the rise of the subsequent control signal VH1, and the detection signal VS2 having an L level is output from the inverter circuit 98 (see time t11). Then, the switches SW2 and SW4 are turned off by the detection signal VS2 of the L level.

Next, the operation of the DC-DC converter 1A when the load 2 suddenly changes will now be described with reference to simulation results of FIGS. 12 and 13.

FIG. 12 illustrates the simulation result of the operation of the DC-DC converter 1A when an output current Io1 is suddenly changed. Further, FIG. 13 illustrates the simulation result of the operation of the DC-DC converter 1A of the first embodiment when an output current Io1 is suddenly changed. In simulation conditions of FIGS. 12 and 13, the input voltage Vin is 5.0 [V], the target voltage of the output voltage Vout1 is 1.5 [V], and the target voltage of the output voltage Vout2 is 1.2 [V]. Further, in the simulation conditions, an output current Io2 is 200[mA], an inductance value of the coil L is 3.3 [μH], capacitances of capacitors C1 and C2 are 10 [μF], and a frequency of the cyclic signal CK is 1.5 [MHz]. Then, FIGS. 12 and 13 illustrate simulation results in changing the output current Io1 from 200 [mA] to 0 [mA].

First, the operation of the DC-DC converter 1 of the first embodiment will now be described.

As illustrated in FIG. 13, when the load 2 suddenly changes to a light load and the output current Io1 suddenly decreases (200 [mA]→0 [mA]), the output voltage Vout1 suddenly increases, and the output voltage Vout1 becomes higher than the target voltage (here, 1.5 V). Thus, the output voltage overshoots. Then, the error signal S2, that is based on the second feedback voltage VFB2 according to the output voltage Vout1 and the cyclic signal CK, becomes lower than the reference value of the cyclic signal CK, and the control signal VH2 comes to be at the L level at all times in each cycle T of the cyclic signal CK (see time t12). That is, the duty of the control signal VH2 becomes 0%, and the transistor T3 is in the state of being turned off at all times and the transistor T4 is in the state of being turned on at all times in each cycle of the cyclic signal CK. Here, the combined voltage Vout obtained by adding the output voltage Vout1 that had been overshot and the output voltage Vout2 is fed back to the first control unit 30. As a result, the output voltage Vout2 becomes stabilized in a state of being undershot in correspondence with the overshoot of the output voltage Vout1.

In the DC-DC converter 1A of the second embodiment, when the duty of the control signal VH2 becomes 0% after the sudden change in the load 2 (see time t13), the detection circuit 90 detects this situation and outputs the detection signal VS1 having an L level and the detection signal VS2 having an H level. Then, the detection signals VS1 and VS2 turn the switches SW1 and SW3 off and turn the switches SW2 and SW4 on. Thus, the output terminal Po1 from which the output voltage Vout1 that had been overshot is output is decoupled from the node N1 of the first feedback voltage generation circuit 31A. Accordingly, in the first feedback voltage generation circuit 31A, the first feedback voltage VFB1 is generated in accordance with only the output voltage Vout1 among the output voltages Vout1 and Vout2. In this case, the resistor R6 for adjustment to maintain the output voltage Vout2 to the target voltage is coupled to the resistor R3. Thus, after when the duty of the control signal VH2 became 0%, although the output voltage Vout2 once undershoots, the output voltage Vout2 may be stabilized at the target voltage (here, 1.2 V) by the feedback control with the first control unit including the first feedback voltage generation circuit 31A, the error amplification circuit 32, and the PWM control circuit 40.

Although a detailed description is omitted herein, when the duty of the control signal VH2 becomes 100% by the sudden change of the load 2 or 3, the output voltage Vout1 is maintained at the target voltage by decoupling the output terminal Po2 from the node N1 of the first feedback voltage generation circuit 31A.

The second embodiment as described above has the following advantages in addition to advantages (1) to (6) of the first embodiment.

(8) The detection circuit 90 generates the detection signal VS1 having an L level when detecting that the transistor T3 is not turned on in one cycle of the control signal VH1, and electrically decouples the output terminal Po1 coupled to the transistor T3 that is not turned on from the node N1 (combining circuit). Further, the detection circuit 90 generates the detection signal VS2 having an L level when detecting that the transistor T3 remains turned on (that is, the transistor T3 is not turned off) in one cycle of the control signal VH1, and electrically decouples the output terminal Po2 coupled to the transistor T4, which is other than the transistor T3 that remains turned on, from the node N1 (combining circuit). Accordingly, even when one of the output voltages overshoots or undershoots due to the sudden change in the load, the other output voltage being undershot or overshot may be suppressed. That is, the voltage fluctuation of the output voltages Vout1 and Vout2 upon the sudden change in the load may be improved.

The above embodiments may apparently be carried out in various manners without going beyond the scope of the invention. For example, it may be understood that the present embodiments may be carried out in the following manners.

In the above embodiments, each of the first and the second reference values is set at the same reference voltage Vr. However, the first and the second reference values may of course be set to different reference voltages (first and second reference voltages). In this case, for example, each resistance value in the first feedback voltage generation circuit 31 may be set corresponding to the first reference voltage, and each resistance value in the second feedback voltage generation circuit 51 may be set corresponding to the second reference voltage. This applies in the same manner to each modification described below.

The above embodiments were applied to the step-down type DC-DC converter 1 that generates two output voltages Vout1 and Vout2 that are lower than the input voltage Vin by one coil L. Instead, and as illustrated for example in FIG. 14, a step-up type DC-DC converter may generate two output voltages Vout1 and Vout2 that are higher than the input voltage Vin by one coil La. Differences from the first embodiment will now be described below. A magnitude relationship of the input and output voltages in this example is Vin<Vout1<Vout2.

A DC-DC converter 1B includes a converter unit 10A, an output switch circuit 20A, capacitors C1 and C2, a first control unit 30A, a second control unit 50A, and an oscillator 70.

In the converter unit 10A, a coil La and a transistor T5 on main side are coupled in series between an input terminal Pi supplied with an input voltage Vin and the ground. The transistor T5 is, for example, an N-channel MOS transistor.

The coil La has a first terminal coupled to the input terminal Pi and a second terminal coupled to a drain (first terminal) of the transistor T5. A source (second terminal) of the transistor T5 is coupled to the ground.

A control signal VH1 is supplied from the first control unit 30A to a gate (control terminal) of the transistor T5. The transistor T5 is turned on and off by the control signal VH1.

Drains of N-channel MOS transistors T3a and T4a in the output switch circuit 20A are coupled to a coupling node between the coil La and the transistor T5, that is, a second terminal LXa of the coil La.

A source of the transistor T3a is coupled to the capacitor C1 and an output terminal Po1. A back gate of the transistor T3a is coupled to a source of the transistor T3a. This connection forms a body diode D1a in which direction from the source to the drain of the transistor T3a (direction from the output terminal Po1 toward the coil La) becomes a forward direction. That is, the body diode D1a includes an anode coupled to the output terminal Pot and a cathode coupled to the second terminal LY of the coil La.

A source of the transistor T4a is coupled to a capacitor C2 and an output terminal Po2. A back gate of the transistor T4a is coupled to a drain of the transistor T4a. This connection forms a body diode D2a in which direction from the drain toward the source of the transistor T4a (direction from the coil La toward the output terminal Po2) becomes a forward direction. That is, the body diode D2a includes an anode coupled to the output terminal Po1 and a cathode coupled to the second terminal LY of the coil La. In other words, the body diode D2a is formed between the output terminal Po2 from which the highest output voltage Vout2 is output among the output voltages Vout1 and Vout2 and the coil La.

The first control unit 30A controls the transistor T5 to turn on and off based on a combined voltage Vout of the output voltages Vout1 and Vout2 and a first reference value (a reference voltage Vr in the present example). Thus, the first control unit 30A causes the combined voltage Vout to approach a target voltage. In other words, the first control unit 30A adjusts an on-time of the transistor T5 based on the combined voltage Vout and the reference voltage Vr so that desired power is supplied respectively to loads 2 and 3. In the present example, the first control unit 30A supplies a control signal VH1, which has a fixed frequency (cycle) and a pulse width that changes according to the power supplied to the loads 2 and 3, to the transistor T5. The control signal VH1 is also supplied to NOR circuits 100 and 101. In the first control unit 30A of the present embodiment, a driver circuit 44 (see FIG. 1) is omitted in correspondence with a configuration of the converter unit 10A.

The second control unit 50A controls the transistors T3 and T4 to turn on and off based on the output voltage Vout1 (first output voltage) and a second reference value (a reference voltage Vr in the present example). Thus, the second control unit 50A brings the output voltage Vout1 closer to the target voltage. In other words, the second control unit 50 adjusts an on-time of the transistor T3 based on the output voltage Vout1 and the reference voltage Vr so that the desired power is supplied to the load 2. In the present example, the second control unit 50 supplies control signals VH3 and VL3, which have a fixed frequency (cycle) and a pulse width that changes according to the power supplied to the load 2, to the transistors T3 and T4.

The second control unit 50A includes a second feedback voltage generation circuit 51, an error amplification circuit 52, a PWM control circuit 60, and NOR circuits 100 and 101.

The control signal VH1 from the first control unit 30A is supplied to the NOR circuit 100. Further, the control signal VH2 from the driver circuit 63 in the PWM control circuit 60 is supplied to the NOR circuit 100. An output terminal of the NOR circuit 100 is coupled to the gate of the transistor T4. The NOR circuit 100 generates the control signal VL3 indicating a result of a NOR calculation of the control signals VH1 and VH2, and supplies the control signal VL3 to the gate of the transistor T4.

The control signal VH1 from the first control unit 30A and the control signal VL2 from the driver circuit 64 in the PWM control circuit 60 are supplied to the NOR circuit 101. An output terminal of the NOR circuit 101 is coupled to the gate of the transistor T3. The NOR circuit 101 generates the control signal VH3 indicating a result of a NOR calculation of the control signals VH1 and VL2, and supplies the control signal VH3 to the gate of the transistor T3.

The NOR circuits 100 and 101 are logic circuits that generate the control signals VH3 and VL3 based on the control signals VH1, VH2, and VL2 so that the transistors T3 and T4 that function as synchronization switch circuits are not turned on when the transistor T5 on the main side is turned on. These control signals VH3 and VL3 have the same cycle T as the control signal VH1.

Next, the operation of the DC-DC converter 1B will now be described.

Figure 15:
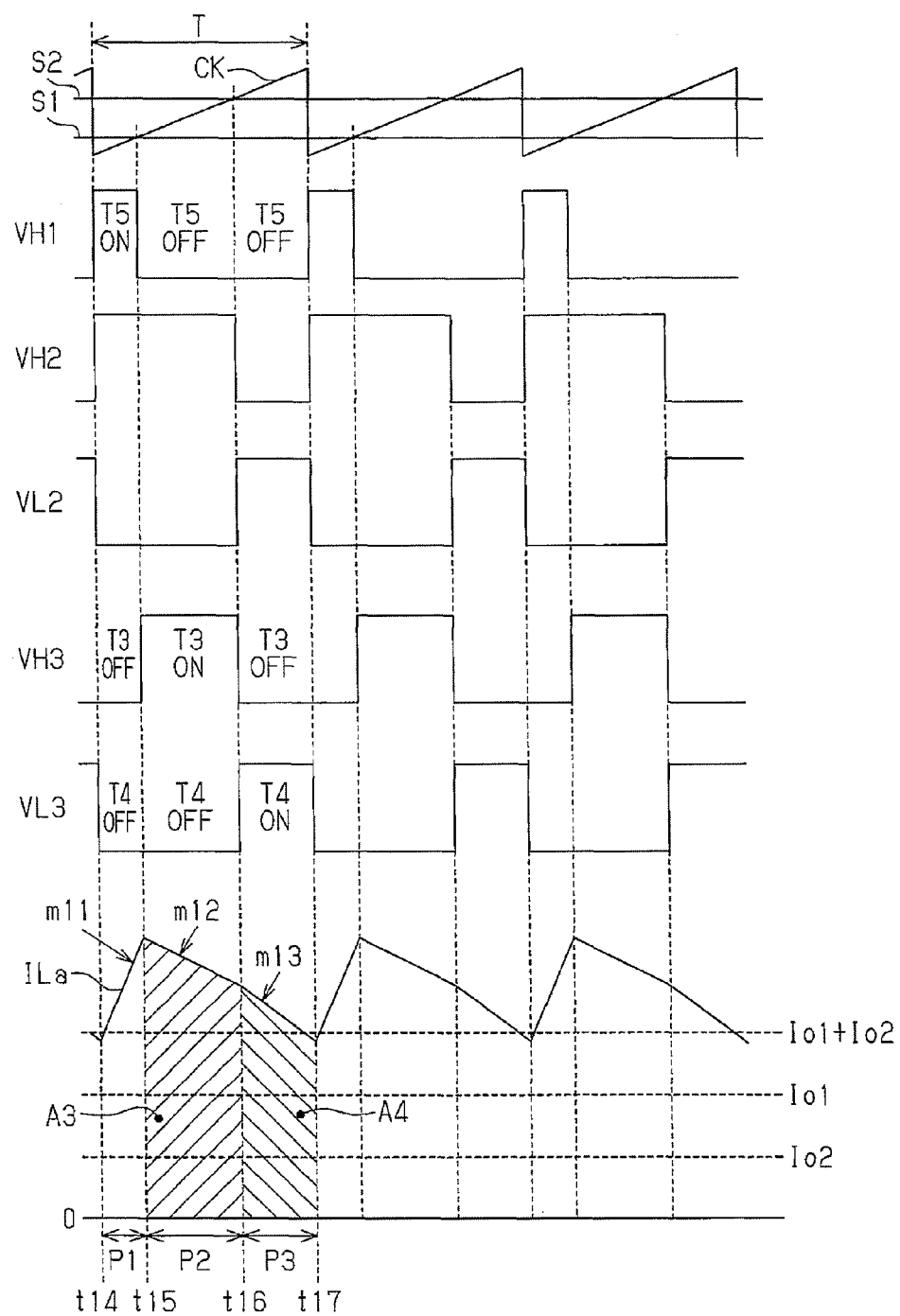
FIG. 15 is a waveform chart illustrating the operation of the DC-DC converter of the modification.

As illustrated in FIG. 15, at time t14, when the cyclic signal CK is reset to the reference value in the fixed cycle T, a level of the cyclic signal CK becomes lower than error signals S1 and S2. Then, a PWM signal SG1 having an H level is output from the PWM comparison circuit 41, and a PWM signal SG2 having an H level is output from the PWM comparison circuit 61. Thus, the control signal VH1 having an H level is generated in response to the PWM signal SG1 of the H level, and the control signal VH2 having an H level and the control signal VL2 having an L level are generated in response to the PWM signal SG2 of the H level. Further, the control signal VH3 having an L level and the control signal VL3 having an L level are generated in response to these control signals VH1, VH2, and VL2. Thus, the transistor T5 is turned on, and the transistors T3 and T4 are turned off. As a result, the second terminal LXa of the coil La is coupled to the ground via the transistor T5. This forms a current flow passage from the input terminal Pi to the ground via the coil La. During such a state, that is, in a first period P1 from time t14 to time t15, a coil current ILa corresponding to the input voltage Vin flows to the coil La, and energy is accumulated in the coil La. In the first period P1, the coil current ILa increases by a certain inclination as time passes. An increasing inclination m11 of the coil current ILa in the first period P1 is expressed by the following equation 8, where an inductance value of the coil La is "La".

[Equation 8]
$$m11 = \frac{Vin}{La} \quad (8)$$

That is, the coil current ILa in the first period P1 increases proportional to the input voltage Vin.

Next, when the level of the cyclic signal CK that gradually increases by a certain increasing property from time t14 becomes higher than the error signal S1 (see time t15), the PWM signal SG1 having an L level is output from the PWM comparison circuit 61. When the control signal VH1 having an L level is generated in response to the PWM signal SG1 of the L level, the control signal VH3 having an H level and the control signal VL3 having an L level are generated. Thus, the transistor T5 is turned off. Further, the transistor T3 is turned on and the transistor T4 is turned off. Then, the second terminal LXa of the coil La is coupled to the output terminal Po1 via the transistor T3. This forms a current flow passage from the input terminal Pi to the output terminal Pot via the coil La. During such a state, that is, in a second period P2 from time t15 to time t16, the energy accumulated in the coil La in the first period P1 is discharged toward the output terminal Po1, and an induction current flows in the coil La. In the second period P2, the coil current ILa decreases by a certain inclination as time passes. A decreasing inclination m12 of the coil current ILa in the second period P2 is expressed by the following equation 9.

[Equation 9]
$$m12 = \frac{Vout1 - Vin}{La} \quad (9)$$

That is, the coil current ILa in the second period P2 decreases proportional to a potential difference between the output voltage Vout1 and the input voltage Vin. Since a voltage direction of the coil La is identical to a direction of the input voltage Vin upon the energy discharge, the output voltage Vout1 increased than the input voltage Vin is generated at the output terminal Po1.

Next, when the level of the cyclic signal CK becomes higher than the error signal S2 (see time t16), the PWM signal SG2 having an L level is output from the PWM comparison circuit 61. When the control signal VH2 having an L level and the control signal VL2 having an H level are generated in response to the PWM signal SG2 of the L level, the control signal VH3 having an L level and the control signal VL3 having an H level are generated. Thus, the transistor T3 is turned off and the transistor T4 is turned on. Then, the second terminal LXa of the coil La is coupled to the output terminal Po2 via the transistor T4. This forms a current flow passage from the input terminal Pi to the output terminal Po2 via the coil La. During such a state, that is, in a third period P3 from time t16 to time t17, the energy accumulated in the coil La in the first period P1 is discharged toward the output terminal Po2, and an induction current flows in the coil La. In the third period P3, the coil current ILa decreases by a certain inclination as time passes. A decreasing inclination m13 of the coil current ILa in the third period P3 is expressed by the following equation 10.

[Equation 10]

$$m13 = \frac{Vout2 - Vin}{La} \quad (10)$$

That is, the coil current ILa in the third period P3 decreases proportional to a potential difference between the output voltage Vout2 and the input voltage Vin. Since the voltage direction of the coil La is identical to the direction of the input voltage Vin upon the energy discharge, the output voltage Vout2 increased than the input voltage Vin is generated at the output terminal Po2.

Then, when the cyclic signal CK is reset again to the reference value at the fixed cycle T (see time t17), the transistor T5 is turned on and the transistors T3 and T4 are both turned off. Thus, the subsequent cycle T is started, and the first period P1, the second period P2, and the third period P3 take place in this order in the cycle T.

Here, an average value obtained by averaging a total current amount of the coil current ILa (see regions A3 and A4) in the period during which the transistor T5 on the main side is turned off (second period P2 and the third period P3) by the cycle T becomes a total value Io1+Io2 of output currents Io1 and Io2 supplied to the loads 2 and 3. Thus, the average value of the coil current ILa in the cycle T (first period P1 to third period P3) becomes larger than the total value Io1+Io2. Further, an average value obtained by averaging the total current amount of the coil current ILa (see region A3) in the period during which the transistor T3 is turned on (second period P2) by the cycle T becomes the output current Io1 supplied to the load 2. Further, an average value obtained by averaging the total current amount of the coil current ILa (see region A4) in the period during which the transistor T4 is turned on (third period P3) by the cycle T becomes the output current Io2 supplied to the load 3.

In such a DC-DC converter 1B, in the same manner as the first embodiment, the first control unit 30A controls an on-time of the transistor T5 based on the combined voltage Vout and the reference voltage Vr so that the combined voltage Vout approaches the target voltage that is based on the reference voltage Vr and resistors R1 to R3. In other words, in the first control unit 30A, the total value Io1+Io2 of the output currents Io1 and Io2, that is, the total current amount of the coil current ILa, is controlled based on the combined voltage Vout and the reference voltage Vr so that the desired currents are supplied to the loads 2 and 3.

Further, the second control unit 50A controls an on-time of the transistor T3 based on the output voltage Vout1 and the reference voltage Vr so that the output voltage Vout1 approaches the target voltage that is based on the reference voltage Vr and resistors R4 and R5. In other words, in the second control unit 50, the time range for supplying the coil current ILa to the capacitor C1 (output terminal Po1) is controlled (determined) based on the output voltage Vout1 and the reference voltage Vr so that the desired output current Io1 is supplied to the load 2. The remaining time of the cycle T excluding the determined time range is used as time for supplying the coil current ILa to the capacitor C2 on side of the output voltage Vout2 that is not used as the feedback signal of the second control unit 50A. Accordingly, in the second control unit 50A, the ratio of the period for allotting the coil current ILa to the capacitors C1 and C2 (output terminals Po1 and Pot) is controlled based only on the output voltage Vout1 among the output voltages Vout1 and Vout2.

The configuration of the modification as described above, advantages (1) to (5) of the first embodiment may be achieved.

Alternatively, the above embodiments may be applied to an inverted type DC-DC converter that generates two output voltages inverted from an input voltage Vin with one coil L. Further, the above embodiments may be applied to a single inductor multiple output type DC-DC converter combined with the step-down type, step-up type, and the inverted type DC-DC converters. For example, the above-embodiments may be applied to a DC-DC converter using one coil L and combined with a step-up type DC-DC converter that generates an output voltage, which is higher than an input voltage Vin, and an inverted type DC-DC converter that generates an output voltage, which is inverted from the input voltage Vin.

The above embodiments are applied to the single inductor multiple output type DC-DC converter that generates two output voltages Vout1 and Vout2 with one coil L. Instead, for example, the above embodiments may be applied to a single inductor multiple output type DC-DC converter that generates three or more output voltages with one coil L. A single inductor multiple output type DC-DC converter 1C that generates three output voltages Vout1, Vout2, and Vout3 with one coil L will now be described with reference to FIG. 16.

Figure 16:
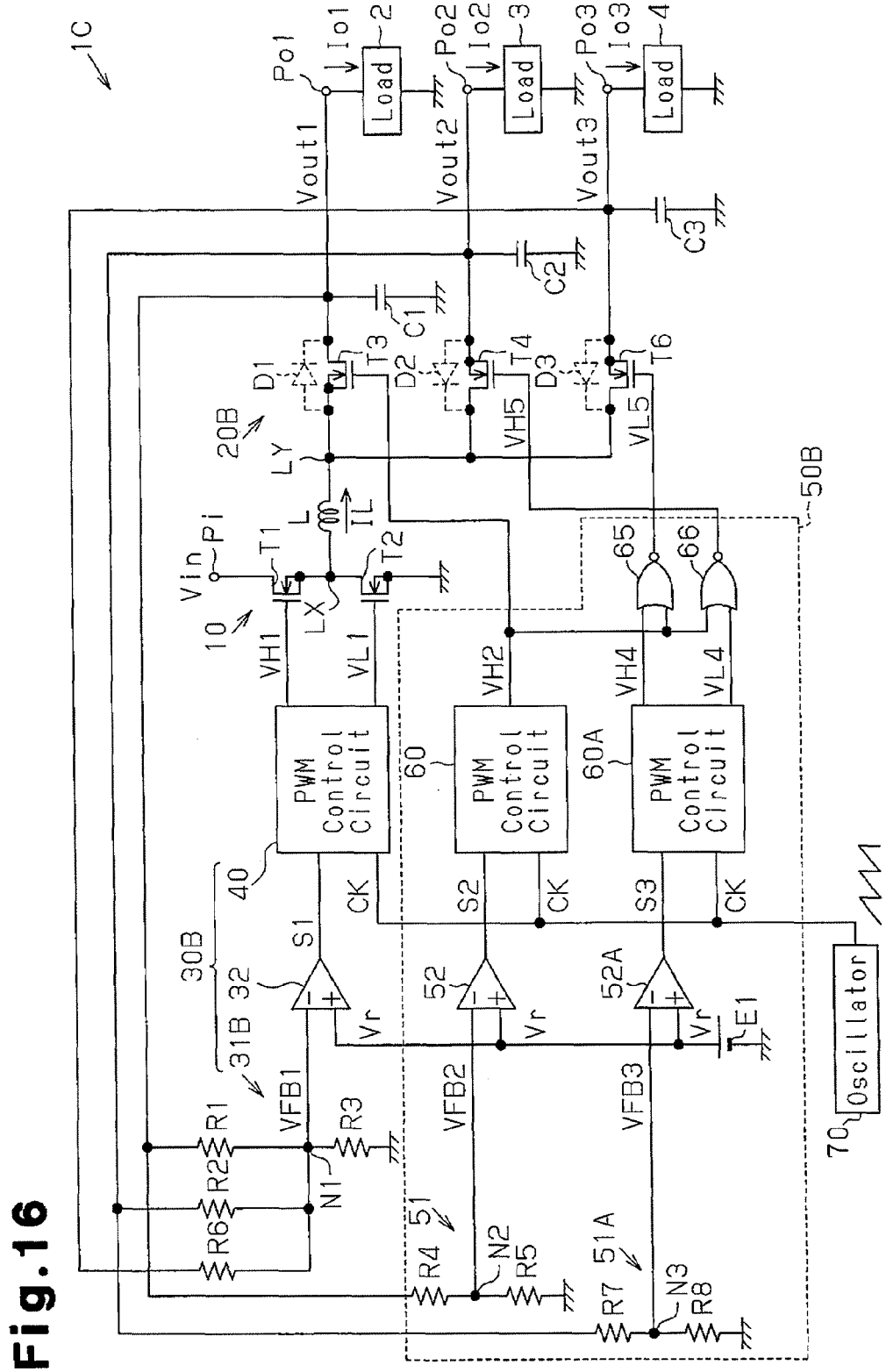
FIG. 16 is a block circuit diagram illustrating a DC-DC converter of another modification.

The DC-DC converter 1C illustrated in FIG. 16 is a step-down type DC-DC converter of a synchronously rectifying method that generates three output voltages Vout1, Vout2, and Vout3 that are lower than an input voltage Vin. The output voltage Vout1 is supplied to a load 2 coupled to an output terminal Po1, the output voltage Vout2 is supplied to a load 3 coupled to an output terminal Pot, and the output voltage Vout3 is supplied to a load 4 coupled to an output terminal Po3. A magnitude relationship of the input and output voltages in the present examples is Vout3<Vout2<Vout1<Vin.

The DC-DC converter 1C includes a converter unit 10, an output switch circuit 20B, capacitors C1, C2, and C3, a first control unit 30B, and a second control unit 50B.

The output switch circuit 20B includes N-channel MOS transistors T3, T4, and T6 coupled to a second terminal LY of a coil L. The transistor T6 has a drain (first terminal) coupled to the second terminal LY of the coil L and a source (second terminal) coupled to a first terminal of the capacitor C3. A back gate of the transistor T6 is coupled to the drain of the transistor T6. This connection forms a body diode D3 in which direction from the source toward the drain of the transistor T6 (direction from the output terminal Po3 toward the coil L) becomes a forward direction. That is, the body diode D3 has an anode coupled to the output terminal Po3 and a cathode coupled to the second terminal LY of the coil L.

A second terminal of the capacitor C3 is coupled to the ground. The first terminal of the capacitor C3 is coupled to the output terminal Po3. The output voltage Vout3 that is a voltage between both ends of the capacitor C3 is supplied from the output terminal Po3 to the load 4. The capacitor C3 is included in a first smoothing circuit that smoothes the output voltage Vout3.

The first control unit 30B controls transistors T1 and T2 to turn on and off based on a combined voltage Vout, which is obtained by adding the output voltages Vout1, Vout2, and Vout3, and a first reference value (a reference voltage Vr in the present example). Thus, the first control unit 30B causes the combined voltage Vout to approach a target voltage. In other words, the first control unit 30B adjusts an on-time of the transistor T1 based on the combined voltage Vout and the reference voltage Vr so that desired power is supplied to the loads 2, 3, and 4. In the present example, the first control unit 30B supplies control signals VH1 and VL1, which have a fixed frequency (cycle) and a pulse width that changes according to the power supplied to the loads 2, 3, and 4, to the transistors T1 and T2.

The first control unit 30B includes a first feedback voltage generation circuit 31B, an error amplification circuit 32, and a PWM control circuit 40.

The first feedback voltage generation circuit 31B generates a first feedback voltage VFB1 according to the combined voltage Vout in which the output voltages Vout1, Vout2, and Vout3 are added. The first feedback voltage generation circuit 31B includes resistors R1, R2, R3, and R6. In the present example, the output terminal Po1 is coupled to the ground via the resistors R1 and R3, the output terminal Pot is coupled to the ground via the resistors R2 and R3, and the output terminal Po3 is coupled to the ground via the resistors R6 and R3. A node N1 between the resistors R1, R2, R3, and R6 is coupled to an inverted input terminal of the error amplification circuit 32. In such a first feedback voltage generation circuit 31B, a first feedback voltage VFB1 in which a divided voltage of the output voltage Vout1, a divided voltage of the output voltage Vout2, and a divided voltage of the output voltage Vout3 are added is generated at the node N1. The first feedback voltage VFB1 is supplied to the inverted input terminal of the error amplification circuit 32.

The second control unit 50B controls the transistors T3 and T4 to turn on and off based on the output voltages Vout1 and Vout2, which remains by excluding the output voltage Vout3 from the output voltages Vout1, Vout2, and Vout3, and a second reference value (a reference voltage Vr in the present example). Thus, the second control unit 50B causes the output voltages Vout1 and Vout2 to approach their respective target voltages. In other words, the second control unit 50B adjusts an on-time of the transistor T3 based on the output voltage Vout1 and the reference voltage Vr so that desired power is supplied to the load 2, and adjusts an on-time of the transistor T4 based on the output voltage Vout2 and the reference voltage Vr so that desired power is supplied to the load 3. In the present example, the second control unit 50B supplies a control signal VH2, which has a fixed frequency (cycle) and a pulse width that changes according to the power supplied to the load 2, to the transistor T3. Further, the second control unit 50B supplies control signals VH4 and VL4, which have a fixed frequency (cycle) and a pulse width that changes according to the power supplied to the load 3, to the transistors T4 and T6.

The second control unit 50B includes a second feedback voltage generation circuit 51, an error amplification circuit 52, a PWM control circuit 60, a third feedback voltage generation circuit 51A, an error amplification circuit 52A, a PWM control circuit 60A, and NOR circuits 65 and 66.

The third feedback voltage generation circuit 51A generates a third feedback voltage VFB3 according to the output voltage Vout2. The third feedback voltage generation circuit 51A includes resistors R7 and R8. In the present example, the output terminal Po2 is coupled to a first terminal of the resistor R7, and a second terminal of the resistor R7 is coupled to a first terminal of the resistor R8. A second terminal of the resistor R8 is coupled to the ground. A node N3 between these resistors R7 and R8 is coupled to an inverted input terminal of the error amplification circuit 52A. The resistors R7 and R8 generate the third feedback voltage VFB3 at node N3 by dividing the output voltage Vout3 based on their resistance values. A value of the third feedback voltage VFB3 depends on a ratio of the resistance values of the resistors R7 and R8 and a potential difference between the output voltage Vout3 and the ground. Thus, the resistors R7 and R8 generate the third feedback voltage VFB3 that is proportional to the output voltage Vout3. The third feedback voltage VFB3 is supplied to an inverted input terminal of the error amplification circuit 52A.

The reference voltage Vr is supplied to a non-inverted input terminal of the error amplification circuit 52A. The reference voltage Vr conforms to the third feedback voltage VFB3 when the output voltage Vout2 reaches the target voltage (standard value).

The error amplification circuit 52A compares the third feedback voltage VFB3 with the reference voltage Vr, generates an error signal S3 by amplifying a voltage difference between the two voltages VFB3 and Vr, and supplies the error signal S3 to the PWM control circuit 60A.

Since the PWM control circuit 60A has substantially the same structure as the PWM control circuit 60 illustrated in FIG. 1, a detailed description will now be omitted herein. The PWM control circuit 60A generates the control signals VH4 and VL4 for controlling the transistors T4 and T6 to turn on and off based on the error signal S3 and the cyclic signal CK so that the third feedback voltage VFB3 approaches the reference voltage Vr. The control signal VH4 is supplied to the NOR circuit 65, and the control signal VH5 is supplied to the NOR circuit 66.

The control signal VH2 is supplied from the PWM control circuit 60 to the NOR circuit 65. An output terminal of the NOR circuit 65 is coupled to the gate of the transistor T6. The NOR circuit 65 generates a control signal VL5 indicating a result of a NOR calculation of the control signals VH2 and VH4, and supplies the control signal VL5 to the gate of the transistor T6.

The control signal VH2 is supplied from the PWM control circuit 60 to the NOR circuit 66. An output terminal of the NOR circuit 66 is coupled to the gate of the transistor T4. The NOR circuit 66 generates the control signal VH5 indicating a result of a NOR calculation of the control signals VH2 and VL4, and supplies the control signal VH5 to the gate of the transistor T4.

These NOR circuits 65 and 66 are logic circuits for determining a priority order of on-control of the transistors T3, T4, and T6. That is, the NOR circuits 65 and 66 determine an order by which the transistors T3, T4, and T6 are to be turned on. In the present example, after when the control signal VH1 having an H level is output from the first control unit 30B, the transistors T3, T4, and T6 are turned on in the order of transistor T3→transistor T4→transistor T6.

Figure 17:
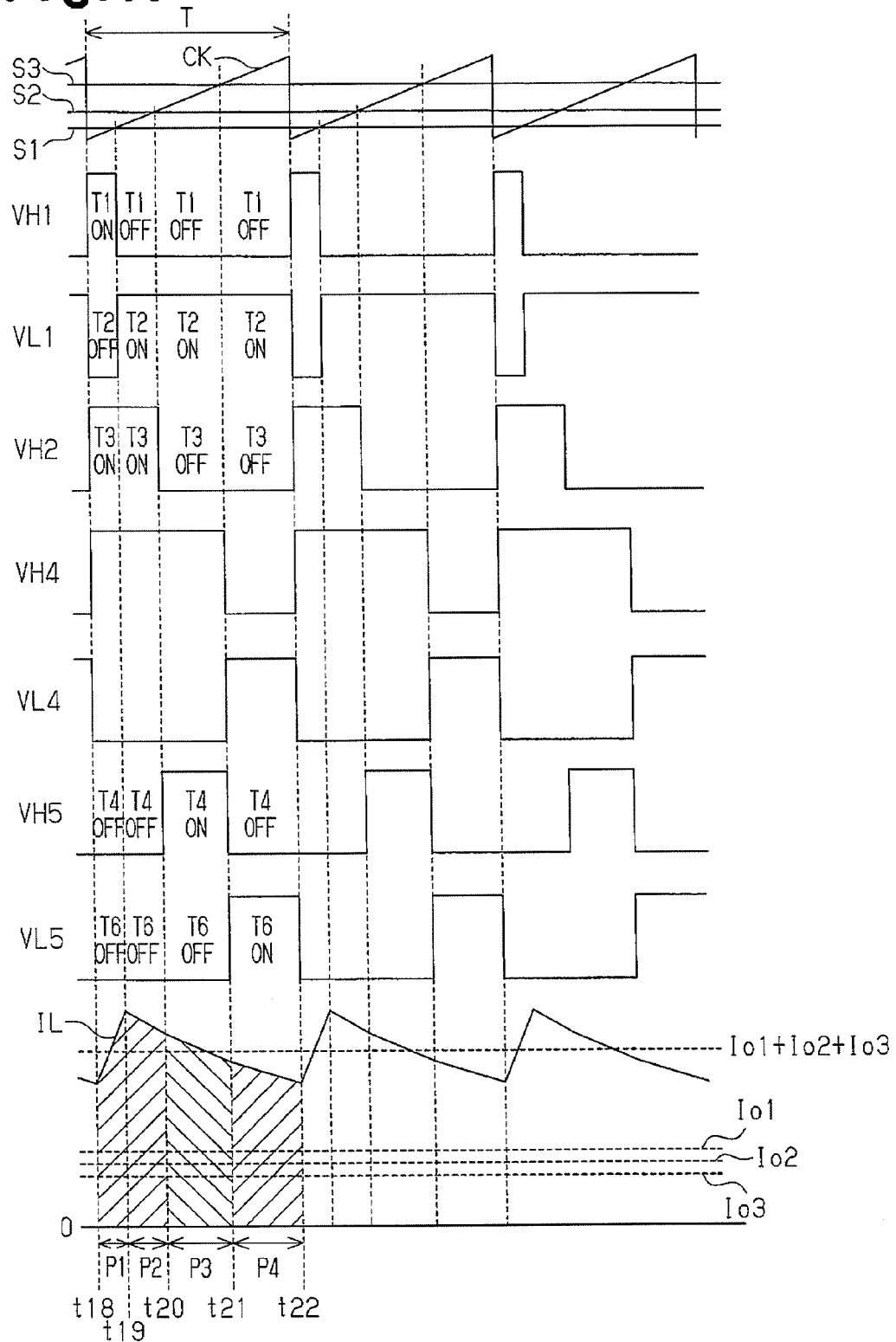
FIG. 17 is a waveform chart illustrating the operation of the DC-DC converter of the another modification.
Figure 18:
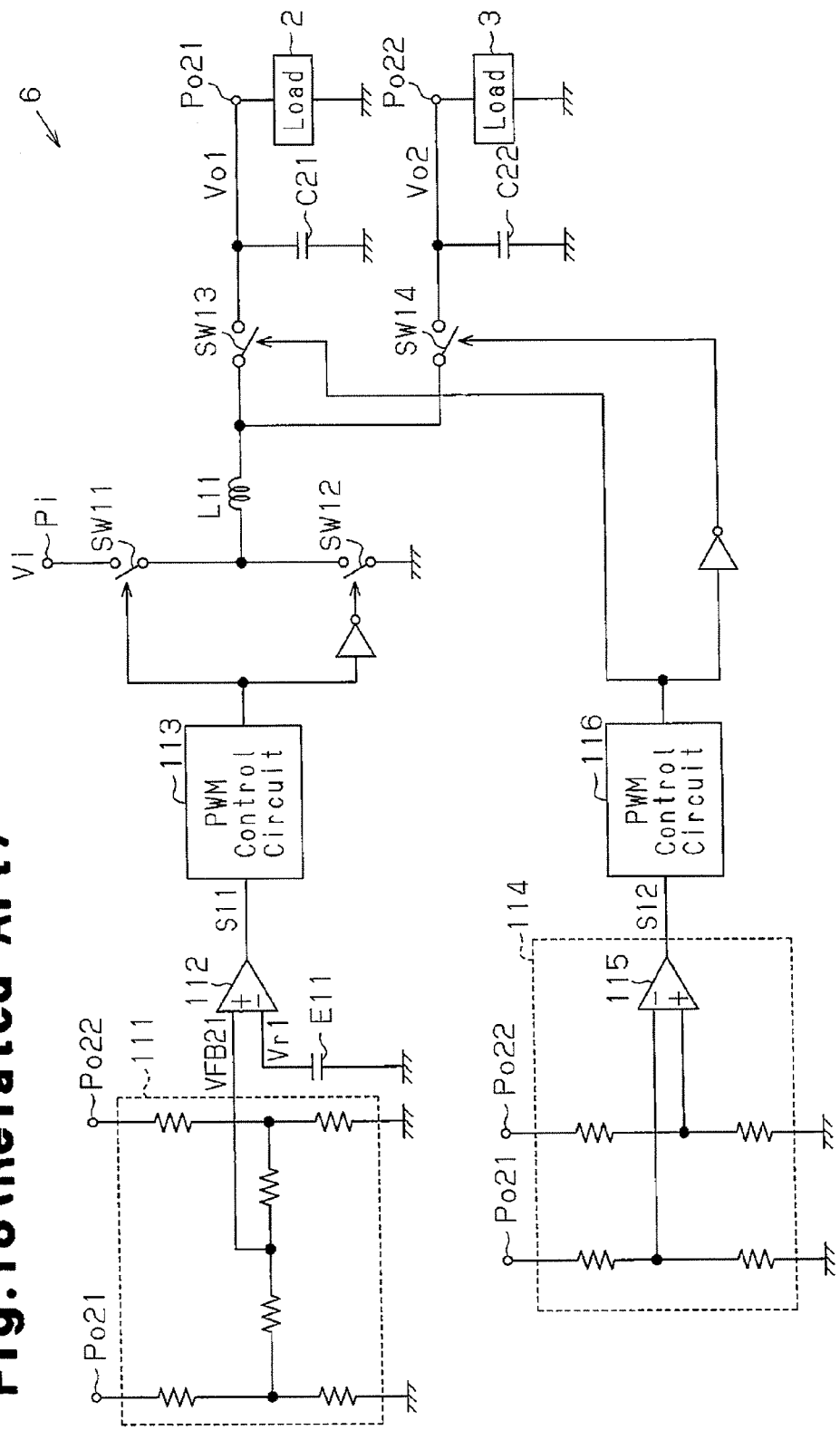
FIG. 18 is a block circuit diagram illustrating a DC-DC converter of a related art.

As illustrated in FIG. 17, at time t18, when the control signal VH1 having an H level and the control signal VL1 having an L level are output from the PWM control circuit 40, the transistor T1 is turned on and the transistor T2 is turned off. Further, at time t18, when the control signal VH2 having an H level is output from the PWM control circuit 60, and the control signal VH4 having an H level and the control signal VL4 having an L level are output from the PWM control circuit 60A, the control signal VL5 having an L level and the control signal VH5 having an H level are respectively output from the NOR circuits 65 and 66. The transistor T3 is turned on and the transistors T4 and T6 are turned off in response to the control signals VH2, VH5, and VL5. Accordingly, in the present example, when the control signal VH2 of the H level for causing the transistor T3 to turn on and the control signal VH4 of the H level for causing the transistor T4 to turn on are generated at the same time, the transistor T3 is turned on first. By such a turn-on of the transistor T3, the output voltage Vout1 is selected out of the output voltages Vout1, Vout2, and Vout3. Thus, in the first period P1 from time t18 to time t19, that is, in a period for accumulating energy in the coil L, a coil current IL increases proportional to a potential difference between the input voltage Vin and the output voltage Vout1. In the second period P2, the coil current IL decreases proportional to the output voltage Vout1.

Next, at time t20, when the level of the cyclic signal CK becomes higher than the error signal S2, the control signal VH2 having an L level is output from the PWM control circuit 60. The transistor T3 is turned off in response to the control signal VH2 of the L level. Further, the control signal VH5 having an H level and the control signal VL5 having an L level are generated in response to the control signal VH2 of the L level, control signal VH4 of the H level, and the control signal VL4 of the L level. The transistor T4 is turned on and the transistor T5 is turned off in response to these control signals VH5 and VL5. By such a turn-on of the transistor T4, the output voltage Vout2 is selected out of the plurality of output voltages Vout1, Vout2, and Vout3. Thus, in the third period P3 from time t20 to time t21, the coil current IL decreases proportional to the output voltage Vout2.

Next, at time t21, when the level of the cyclic signal CK becomes higher than the error signal S3, the control signal VH4 having an L level and the control signal VL4 having an H level are generated from the PWM control circuit 60A, and the control signal VL5 having an H level and the control signal VH5 having an L level are output from the NOR circuits 65 and 66. The transistor T4 is turned off and the transistor T5 is turned on in response to these control signals VH5 and VL5. By such a turn-on of the transistor T5, the output voltage Vout3 is selected out of the plurality of output voltages Vout1, Vout2, and Vout3. Thus, in the fourth period P4 from time t21 to time t22, the coil current IL decreases proportional to the output voltage Vout3.

Then, when the cyclic signal CK is reset again to the reference value at the fixed cycle T (see time t22), the transistor T1 is turned on and the transistor T2 is turned off. Further, the transistor T3 is turned on and the transistors T4 and T6 are turned off. Thus, the subsequent cycle T is started, and the first period P1, the second period P2, the third period P3, and the fourth period P4 take place in this order in the cycle T.

Accordingly, in the second control unit 50B, after when the control signal VH1 having an H level is output from the first control unit 30B, the voltages are selected in the order of output voltage Vout1→output voltage Vout2→output voltage Vout3 by the on-control of the transistors T3, T4, and T6. Here, the magnitude relationship of the output voltages is Vout3<Vout2<Vout1<Vin, as described above. Thus, after when the control signal VH1 having an H level is output, the potential difference between the output voltage selected by the on-control of the transistors T3, T4, and T6 and the input voltage Vin gradually increases. In other words, after when the control signal VH1 of the H level is output, the second control unit 50B turns the transistors T3, T4, and T6 to turn on in the order by which the potential difference between the output voltage by the on-control of the transistors T3, T4, and T6, among the output voltages Vout1, Vout2, and Vout3, and the input voltage Vin gradually increases. Thus, an advantage similar to (6) of the first embodiment may be achieved.

In such a DC-DC converter 1C, in the same manner as the first embodiment, the first control unit 30B controls an on-time of the transistor T1 based on the combined voltage Vout and the reference voltage Vr so that the combined voltage Vout approaches the target voltage that is based on the reference voltage Vr and the resistors R1 to R3 and R6. In other words, in the first control unit 30B, a total value Io1+Io2+Io3 of output currents Io1, Io2, and Io3, that is, a total current amount of the coil current IL is controlled based on the combined voltage Vout and the reference voltage Vr so that desired currents are respectively supplied to the loads 2, 3, and 4.

Further, the second control unit 50B controls an on-time of the transistor T3 based on the output voltage Vout1 and the reference voltage Vr and causes the output voltage Vout1 to approach the target voltage that is based on the reference voltage Vr and the resistors R4 and R5. In other words, in the second control unit 50B, a time range for supplying the coil current IL to the capacitor C1 (output terminal Po1), that is, a time range of first and second periods P1 and P2, is controlled (determined) based on the output voltage Vout1 and the reference voltage Vr so that the desired output current Io1 is supplied to the load 2. Further, the second control unit 50B controls an on-time of the transistor T4 based on the output voltage Vout2 and the reference voltage Vr so that the output voltage Vout2 approaches the target voltage that is based on the reference voltage Vr and the resistors R7 and R8. In other words, in the second control unit 50B, a time range for supplying the coil current IL to the capacitor C2 (output terminal Po2), that is, a time range of third period P3, is determined based on the output voltage Vout2 and the reference voltage Vr so that the desired output current Io2 is supplied to the load 3. The remaining time (fourth period P4) of the cycle T excluding the determined time ranges is used as time for supplying the coil current IL to the capacitor C3 on side of the output voltage Vout3 that is not used as the feedback signal of the second control unit 50B. Accordingly, in the second control unit 50B, the ratio of the period for allotting the coil current IL to the capacitors C1, C2, and C3 (output terminals Pot, Pot, and Po3) is controlled based on the output voltages Vout1 and Vout2 among the plurality of output voltages excluding the output voltage Vout3.

The combined voltage Vout is maintained at the target voltage by a feedback control with the first control unit 30B, and the output voltages Vout1 and Vout2 are maintained at the target voltages by a feedback control with the second control unit 50B. Here, direct current components Vout1 and Vout2 of the output voltages Vout1 and Vout2 are determined as in the following equations 11 and 12 when the resistance values of the resistors R4, R5, R7, and R8 are respectively "R4", "R5", "R7", and "R8".

[Equation 11]

$$Vout1 = \frac{R4 + R5}{R5} \times Vr \qquad (11)$$

[Equation 12]

$$Vout2 = \frac{R7 + R8}{R8} \times Vr \qquad (12)$$

As is apparent from Equations 11 and 12, the output voltages Vout1 and Vout2 fed back to the second control unit 50B are determined by the voltage setting equation that is identical to the case of generating one output voltage by one coil. Thus, in the DC-DC converter 1C, a voltage accuracy of the remaining output voltages Vout1 and Vout2 excluding the output voltage Vout3 may be increased.

In the above embodiments and the modification illustrated in FIG. 16, after when the control signal VH1 having an H level is output, the transistors T3, T4, and T6 are turned on in the order by which the potential difference between the output voltage selected by the on-control of the transistors T3, T4, and T6 and the input voltage Vin gradually increases. However, the order by which these transistors T3, T4, and T6 are turned on is not specifically limited.

Figure 14:
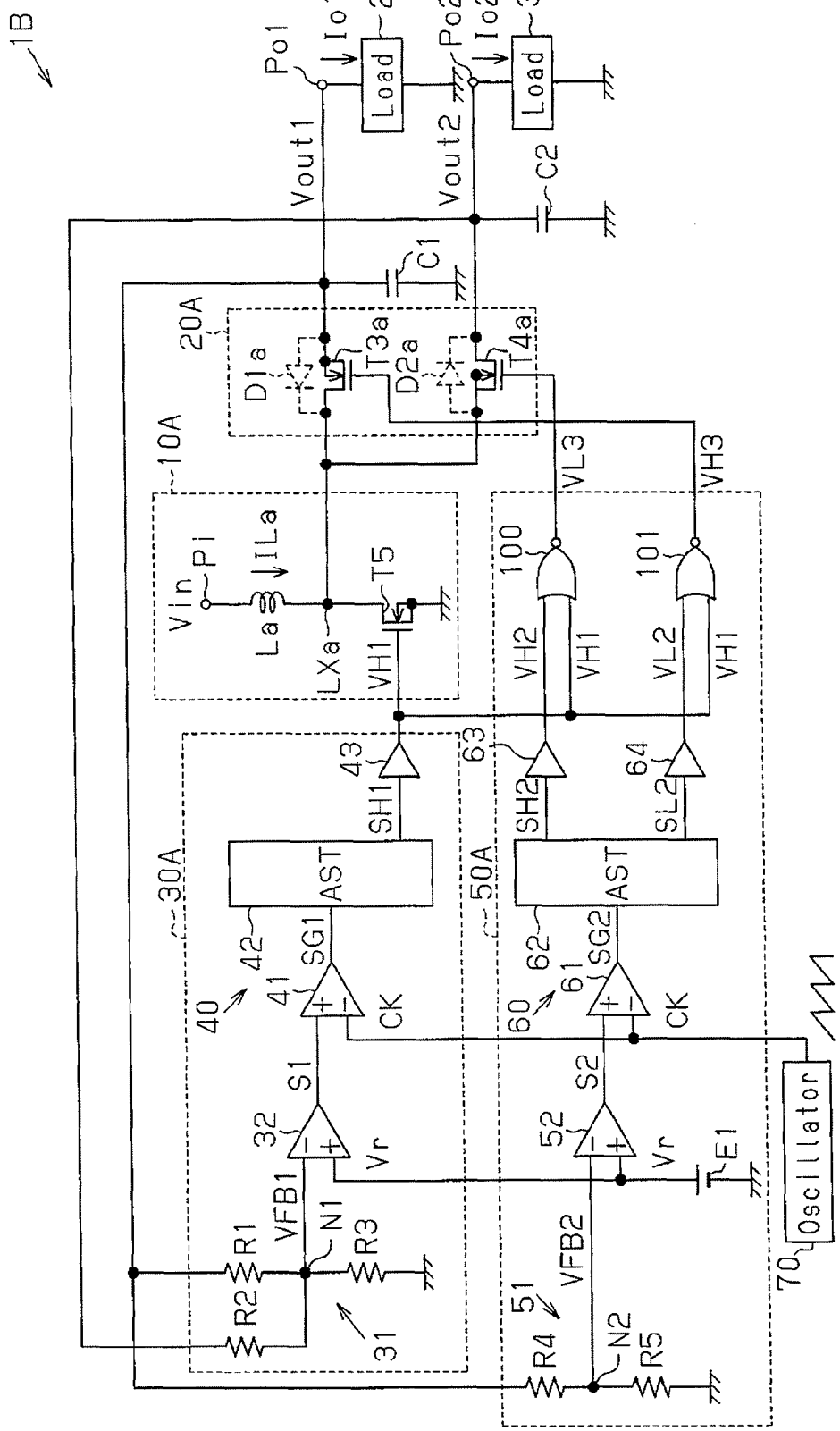
FIG. 14 is a circuit diagram illustrating a DC-DC converter of a modification.

In the above embodiments and the modification illustrated in FIG. 14, the output voltage Vout1 among the plurality of output voltages Vout1 and Vout2 is fed back to the second control units 50 and 50A. Instead, the output voltage Vout2 may be fed back to the second control unit 50.

In the modification illustrated in FIG. 16, the output voltages Vout1 and Vout2 among the plurality of output voltages Vout1, Vout2, and Vout3 are fed back to the second control unit 50B. Instead, for example, the output voltages Vout1 and Vout3 may be fed back, or the output voltages Vout2 and Vout3 may be fed back.

In the above embodiments and the modifications, although the N-channel MOS transistors T1 and T5 are disclosed as examples of the first switch circuit, P-channel MOS transistors may be used. Further, a bipolar transistor may be used as the first switch circuit. Alternatively, a switch circuit including a plurality of transistors may be used as the first switch circuit.

In the above embodiments and the modifications, although the N-channel MOS transistors T3, T4, and T6 are disclosed as examples of the second switch circuit, P-channel MOS transistors may be used. Further, a bipolar transistor may be used as the second switch circuit. Alternatively, a switch circuit including a plurality of transistors may be used as the second switch circuit.

In the above embodiments and the modification illustrated in FIG. 16, although the N-channel MOS transistor T2 is disclosed as an example of a switch circuit on the synchronization side, a P-channel MOS transistor may be used. Further, a bipolar transistor may be used as the switch circuit on the synchronization side. Alternatively, a switch circuit including a plurality of transistors may be used as the switch circuit on the synchronization side.

In the above embodiments and the modification illustrated in FIG. 16, the DC-DC converter is of the synchronously rectifying method. However, the DC-DC converter may be of a non-synchronously rectifying method.

Instead of the body diodes (parasitic diodes) D1, D1a, D2, D2a, and D3 in the above embodiments and modifications, diodes corresponding to the body diodes may be coupled in parallel to the transistors T3, T3a, T4, T4a, and T6.

Further, the body diodes D1, D1a, D2, D2a, and D3 may be omitted.

In the output switch circuits 20 and 20B of the above embodiments and the modification illustrated in FIG. 16, a diode in which direction from the coil L to the output terminal Po1 becomes a forward direction may be provided instead of the transistor T1 coupled to the output terminal Po1 from which the output voltage Vout1 with the highest target voltage is output. That is, a diode having an anode coupled to the second terminal LY of the coil L and a cathode coupled to the output terminal Po1 may be provided between the coil L and the output terminal Po1.

In the output switch circuit 20A of the modification illustrated in FIG. 14, a diode in which direction from the coil La to the output terminal Po2 becomes a forward direction may be provided instead of the transistor T4a coupled to the output terminal Po1 from which the output voltage Vout2 controlled by the highest target voltage is output. This diode is arranged between the coil La and the output terminal Po2 and has an anode coupled to the second terminal LXa of the coil La and a cathode coupled to the output terminal Po2.

In the internal structures of the first control units 30, 30A, and 30B and the second control units 50, 50A, and 50B in the above embodiments and modifications are not specifically limited.

The oscillator 70 in the above embodiments and modifications generates the cyclic signal CK that is a saw-tooth wave signal. Instead, the oscillator 70 may generate a triangular wave signal.

In the above embodiments and modifications, the DC-DC converter is of the voltage control mode. However, a DC-DC converter may be of a current control mode.

In the above embodiments and modifications, the DC-DC converter is of the PWM control method. However, a DC-DC converter may be of a PFM (Pulse Frequency Modulation) control method or a PSM (Pulse Skipping Modulation) control method may be made. In this case, it is preferable that the control signal VH1 that controls the transistors T1 and T5 on the main side to turn on and off and the control signal that controls the output transistors T3, T4, and T6 to turn on and off be the same cycle.

The present embodiments of the invention have been described in detail. However, various alterations, replacements, and modifications may be made without deviating from the concept of the invention.

The invention claimed is:

1. A power supply device comprising:
   a coil;
   a first switch circuit that is connected to a first terminal of the coil and accumulates energy in the coil;
   a plurality of second switch circuits that are connected between a second terminal of the coil and a plurality of output terminals, respectively;
   a first control unit that is connected to the plurality of output terminals and generates a first control signal for controlling the first switch circuit to turn on and off based on a combined value of a plurality of output voltages respectively output from the plurality of output terminals and a first reference value;
   a second control unit that is connected to only a first output terminal of the plurality of output terminals and generates a second control signal for controlling the plurality of second switch circuits to turn on and off in a cycle that is the same as the first control signal based on a first output voltage, which is output from the first output terminal, and a second reference value;
   a first diode arranged between the first output terminal and the second terminal of the coil and including an anode connected to the second terminal of the coil and a cathode connected to the first output terminal;
   a second diode arranged between a second output terminal, which is other than the first output terminal among the plurality of output terminals, and the second terminal of the coil, wherein the second diode includes an anode connected to the second output terminal and a cathode connected to the second terminal of the coil; and
   a first detection circuit that generates a first detection signal when detecting that one of the plurality of second switch circuits is not turned on within one cycle of the first control signal,
   wherein the first output voltage output from the first output terminal is a highest one of the plurality of output voltages, and
   wherein the first control unit includes a combining circuit, which combines the plurality of output voltages, and is configured to electrically disconnect an output terminal, which is connected to the one of the plurality of second switch circuits that is not turned on, among the plurality of output terminals, from the combining circuit in response to the first detection signal.

2. The power supply device according to claim 1, wherein the plurality of second switch circuits include first and second transistors,
the first diode is a parasitic diode of the first transistor, and
the second diode is a parasitic diode of the second transistor.

3. The power supply device according to claim 1, wherein the plurality of output voltages are lower than an input voltage, and
the second control unit is configured to control the plurality of second switch circuits to turn on and off so that after the first control signal for turning on the first switch circuit is output, the plurality of output voltages are sequentially generated in an order by which a potential difference between the input voltage and the output voltage gradually increases.

4. The power supply device according to claim 1, further comprising
a second detection circuit that generates a second detection signal when detecting that one of the plurality of second switch circuits is not turned off within one cycle of the first control signal,
wherein the first control unit is configured to electrically disconnect an output terminal, which is connected to a second switch circuit other than the one of the second switch circuits that is not turned off, among the plurality of output terminals, from the combining circuit in response to the second detection signal.

5. The power supply device according to claim 1, wherein:
the first control unit includes a first amplification circuit, the first amplification circuit including an inverted input terminal, connected to the plurality of output terminals, and a non-inverted input terminal, connected to a node that is supplied with a voltage of the first reference value; and
the second control unit includes a second amplification circuit, the second amplification circuit including an inverted input terminal, connected to only the first output terminal of the plurality of output terminals, and a non-inverted input terminal, connected to a node that is supplied with a voltage of the second reference value.

6. A power supply device comprising:
a control circuit including a first control circuit and a second control circuit, wherein the control circuit includes a first feedback terminal connected to an input terminal of the first control circuit, a first driving output terminal connected to an output terminal of the first control circuit, a second feedback terminal connected to an input terminal of the second control circuit, and second and third driving output terminals respectively connected to first and second output terminals of the second control circuit;
a first switch circuit including a control terminal connected to the first driving output terminal, a first terminal that receives an input voltage, and a second terminal connected to a first terminal of a coil;
a second switch circuit including a control terminal connected to the second driving output terminal, a first terminal connected to a second terminal of the coil, and a second terminal connected to a node between a first capacitor and a first output terminal;
a third switch circuit including a control terminal connected to the third driving output terminal, a first terminal connected to the second terminal of the coil, and a second terminal connected to a node between a second capacitor and a second output terminal;
a first feedback voltage generation circuit that is connected to the first control circuit, the first output terminal, and the second output terminal, and that supplies the first feedback terminal with a first feedback voltage according to a combined voltage of a first output voltage, generated at the first output terminal, and a second output voltage, generated at the second output terminal;
a second feedback voltage generation circuit that is connected to the second control circuit and only the first output terminal of the first and the second output terminals, and that supplies the second feedback terminal with a second feedback voltage according to the first output voltage, and
a first detection circuit that generates a first detection signal when detecting that one of the second switch circuit and the third switch circuit is not turned on within one cycle of a first control signal supplied to the control terminal of the first switch circuit,
wherein the first feedback voltage generation circuit includes a combining circuit, which combines the first output voltage and the second output voltage, and is configured to electrically disconnect one of the first output terminal and the second output terminal, which is connected to one of the second switch circuit and the third switch circuit that is not turned on, from the combining circuit in response to the first detection signal.

7. The power supply device according to claim 6, wherein
the first control circuit includes a first driver circuit, the first driver circuit including an output terminal connected to the first driving output terminal,
the second control circuit includes a second driver circuit, the second driver circuit including an output terminal connected to the second driving output terminal,
the control circuit includes first and second power supply terminals, respectively connected to high potential power supply terminals of the first and second driver circuits, and first and second coil coupling terminals, respectively connected to low potential power supply terminals of the first and second driver circuits, and
the power supply device further comprising:
a diode including a cathode, connected to the first power supply terminal, and an anode, connected to a power supply line that is supplied with a high potential power supply voltage; and
a third capacitor including a first terminal, connected to the first power supply terminal, and a second terminal, connected to the first coil coupling terminal and the first terminal of the coil,
wherein the second power supply terminal is connected to the power supply line, and the second coil coupling terminal is connected to the second terminal of the coil.

8. A method for controlling a power supply including a coil, a first switch circuit that is connected to a first terminal of the coil and accumulates energy in the coil, and a plurality of second switch circuits that are connected between the coil and a plurality of output terminals, respectively, the method comprising:
controlling, by a first control unit connected to the plurality of output terminals, the first switch circuit to turn on and off based on a combined value of a plurality of output voltages respectively output from the plurality of output terminals and a first reference value; and
controlling, by a second control unit connected to only a first output terminal of the plurality of output terminals, the plurality of second switch circuits to turn on and off at a frequency that is the same as a switching frequency of the first switch circuit based on a first output voltage, which is output from the first output terminal, and a second reference value, wherein the power supply includes a first diode arranged between the first output terminal and the second terminal of the coil and including an anode connected to the second terminal of the coil and a cathode connected to the first output terminal, a second diode arranged between a second output terminal, which is other than the first output terminal among the plurality of output terminals, and the second terminal of the coil, wherein the second diode includes an anode connected to the second output terminal and a cathode connected to the second terminal of the coil, and a first detection circuit that generates a first detection signal when detecting that one of the plurality of second switch circuits is not turned on within one cycle of a first control signal that turns on and off the first switch circuit, wherein the first output voltage output from the first output terminal is a highest one of the plurality of output voltages, and wherein the first control unit includes a combining circuit, which combines the plurality of output voltages, and is configured to electrically disconnect an output terminal, which is connected to the one of the plurality of second switch circuits that is not turned on, among the plurality of output terminals, from the combining circuit in response to the first detection signal.

* * * * *